United States Patent

Aoki et al.

[11] Patent Number: 5,864,722
[45] Date of Patent: Jan. 26, 1999

[54] VIBRATION PREVENTING CAMERA

[75] Inventors: Hitoshi Aoki, Tokyo; Akira Katayama, Koganei; Tatsuo Amanuma, Ageo; Noboru Akami, Yokohama; Hidenori Miyamoto, Urayasu; Nobuhiko Terui, Ichikawa; Hiroshi Wakabayashi, Yokohama; Toshiyuki Nakamura; Sueyuki Ohishi, both of Tokyo, all of Japan

[73] Assignee: Nikon Corporation, Tokyo, Japan

[21] Appl. No.: 843,966

[22] Filed: Apr. 17, 1997

Related U.S. Application Data

[63] Continuation of Ser. No. 375,892, Jan. 20, 1995, abandoned.

[30] Foreign Application Priority Data

| Jan. 31, 1994 | [JP] | Japan | 6-027515 |
| Mar. 4, 1994 | [JP] | Japan | 6-034014 |
| Mar. 18, 1994 | [JP] | Japan | 6-072940 |
| Mar. 31, 1994 | [JP] | Japan | 6-063076 |
| Apr. 8, 1994 | [JP] | Japan | 6-093941 |

[51] Int. Cl.$^6$ ................................................ G03B 7/08
[52] U.S. Cl. ........................... 396/263; 396/264; 396/502
[58] Field of Search ................................. 396/263, 264, 396/502

[56] References Cited

U.S. PATENT DOCUMENTS

| 4,816,862 | 3/1989 | Taniguchi et al. | 354/412 |
| 5,153,633 | 10/1992 | Otani | 354/430 |
| 5,204,709 | 4/1993 | Sato | 354/266 |
| 5,337,098 | 8/1994 | Imafuji et al. | 354/430 |
| 5,365,304 | 11/1994 | Hamada et al. | 354/430 |

FOREIGN PATENT DOCUMENTS

| 2-116835 | 5/1990 | Japan . |
| 5-40291 | 2/1993 | Japan . |
| 5-134287 | 5/1993 | Japan . |
| 6-160777 | 6/1994 | Japan . |

*Primary Examiner*—Daniel P. Malley

[57] ABSTRACT

A vibration preventing camera includes a vibration amount detecting unit for detecting the amount of vibration, a vibration correcting unit for correcting vibration, a light measuring unit for measuring the light value at a subject, and a control unit for controlling the vibration correcting unit in consonance with a detection signal that is obtained by the light measuring unit and the vibration detecting unit, and for activating the vibration detecting unit after the length of exposure is determined by the light value at the subject that is obtained by the light measuring unit. More preferably, a vibration preventing camera further includes a self-timer unit, and when the self-timer unit is set for an exposure, the vibration detecting unit is activated after the timing count down for the self-timer unit begins.

23 Claims, 23 Drawing Sheets

| FIG. 12A |
| FIG. 12B |
| FIG. 12C |

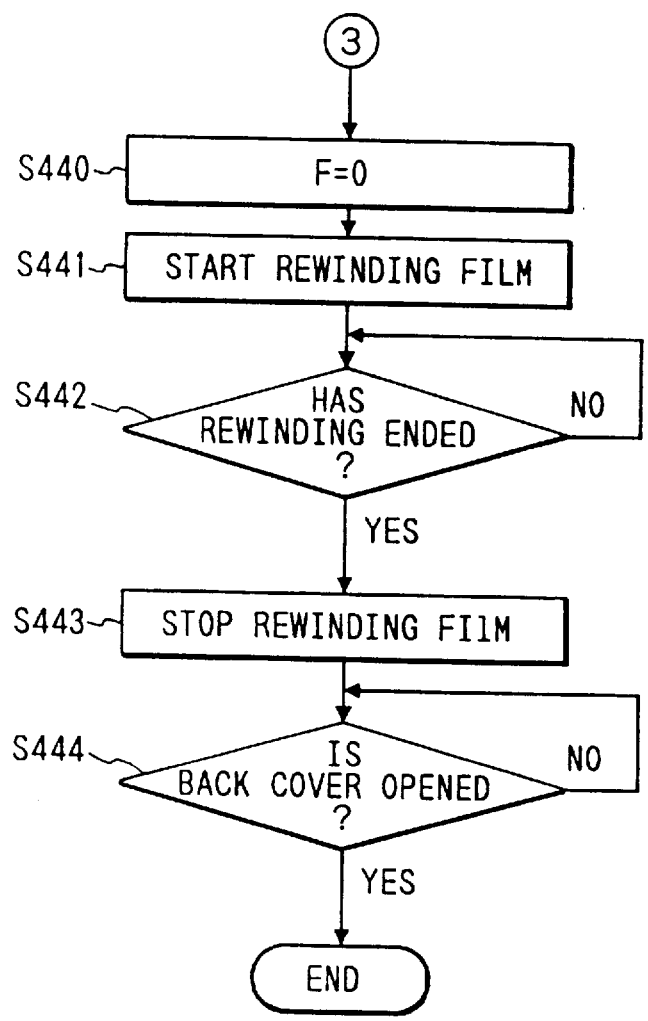

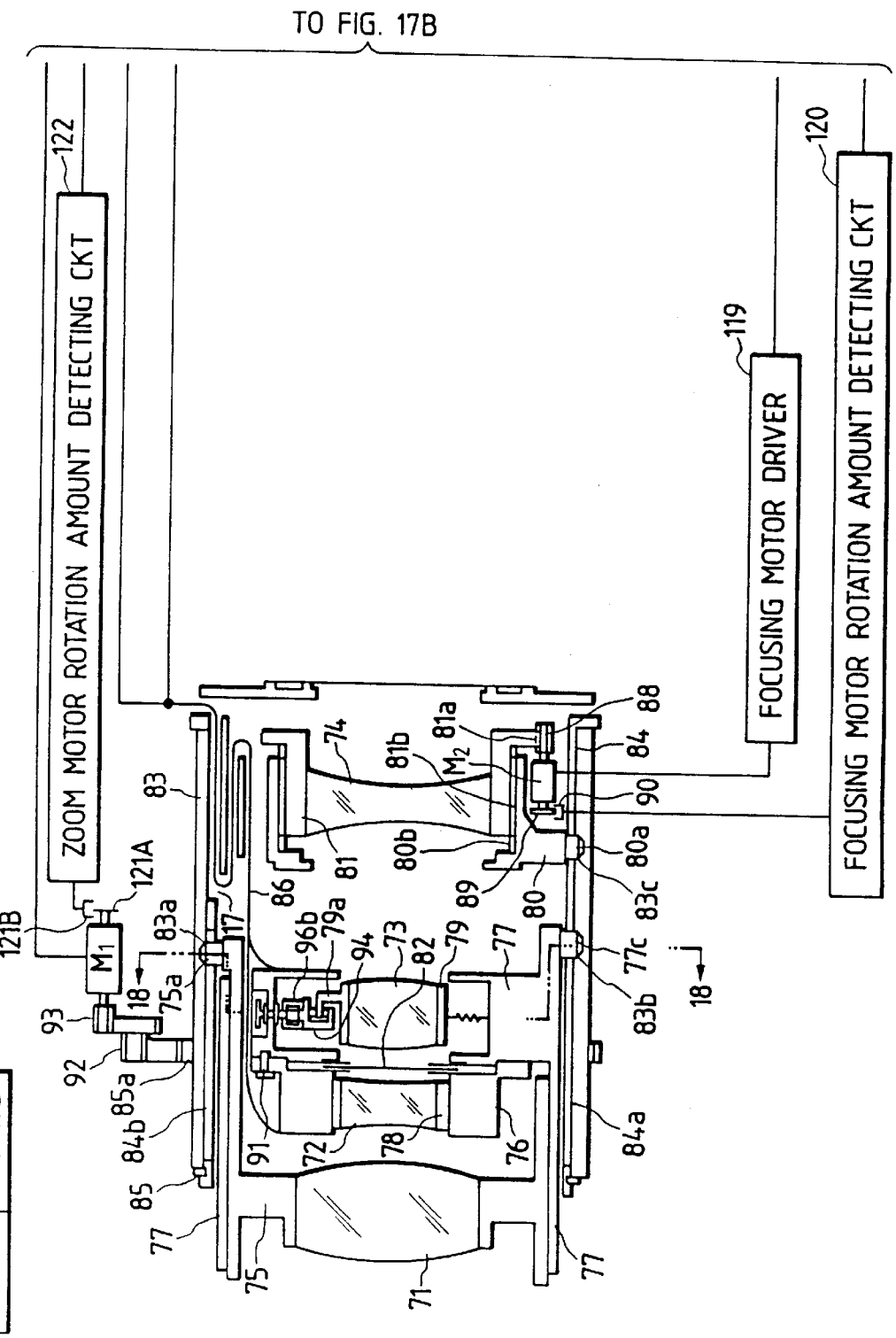

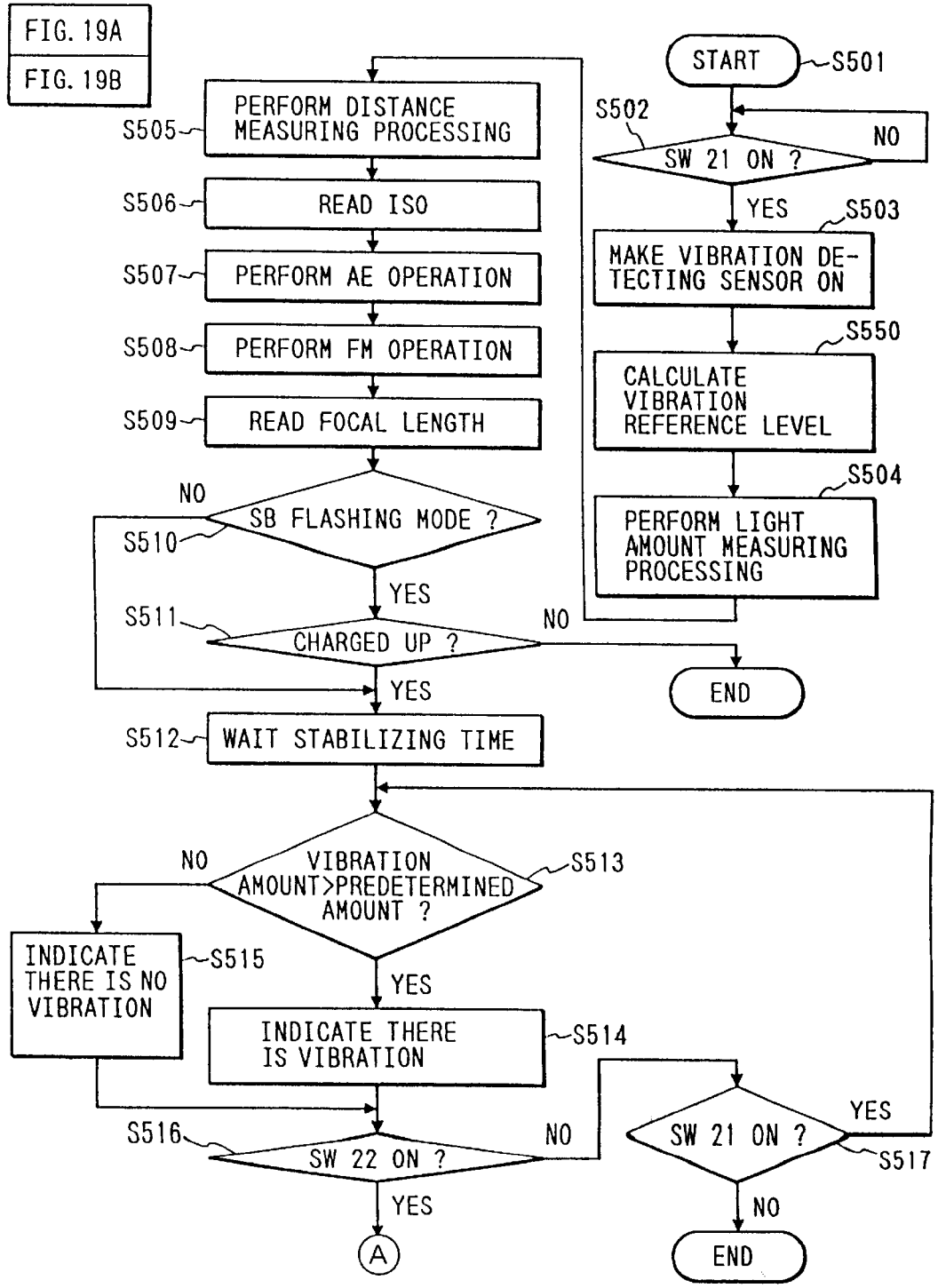

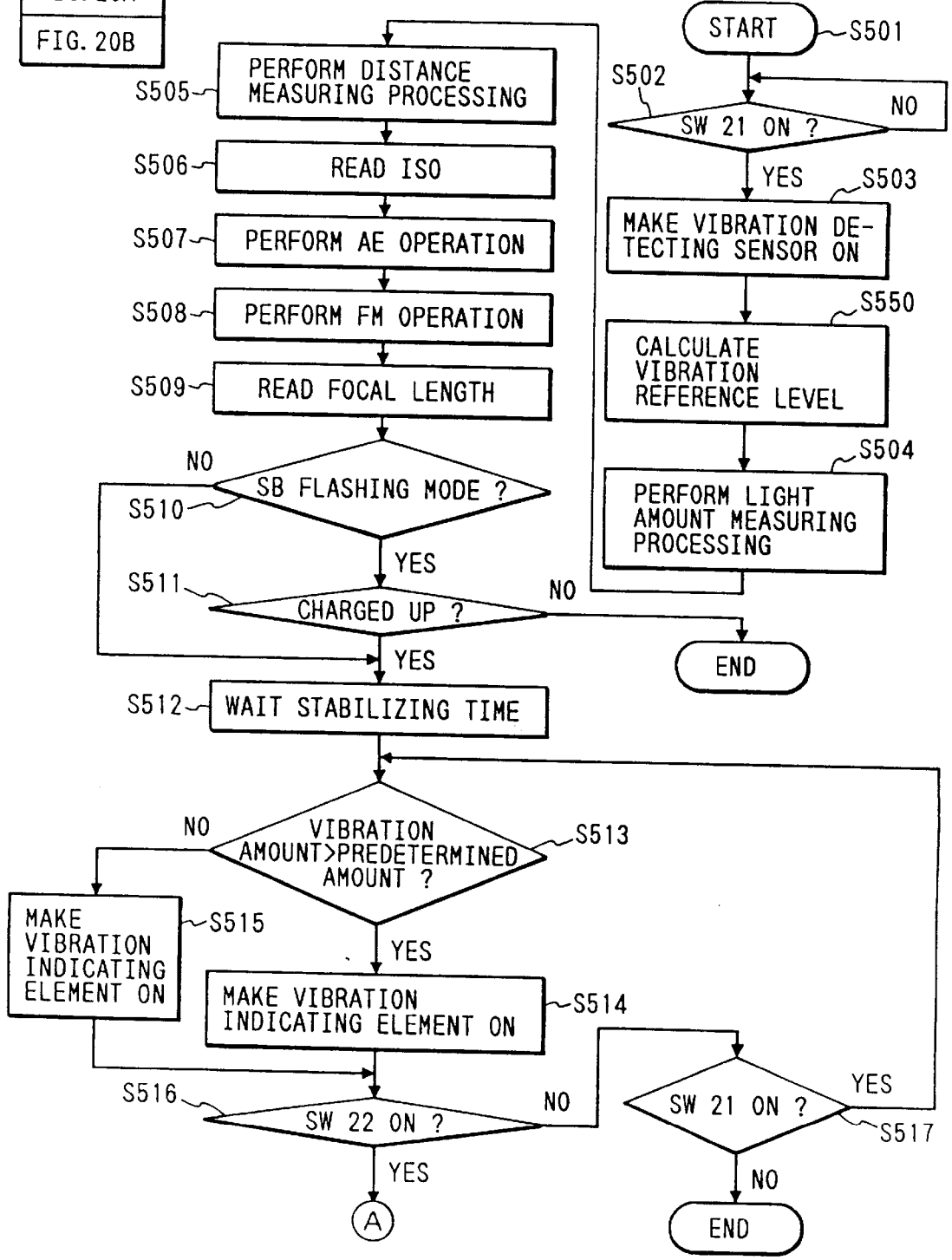

VIBRATION PREVENTING CAMERA

This application is a continuation of application Ser. No. 08/375,892, filed Jan. 20, 1995, now abandoned.

BACKGROUND OF THE INVENTION

1. Field of the Invention

The present invention relates to a vibration preventing camera that has a vibration correcting unit to compensate for the vibration of an image that is caused by the vibration of the hands that are supporting the camera.

2. Related Background Art

Conventionally, in a general vibration preventing camera, an image vibration detecting unit that detects the amount of vibration and an image vibration correcting unit that compensates for the vibration of an image are always active while the power to the camera is on.

Because the unit in a conventional vibration preventing camera is constantly in the active state, battery power is wasted.

Further, for photography that involves the use of a self-timer, when an image vibration detecting unit and an image vibration correcting unit are activated after the expiration of the set delay time for a self-timer, the shutter exposure timing is delayed.

With one of proposed conventional correction functions, the detection of the vibration level is begun, for example, at the half-stroke position for the release button, vibration correction that is based on the detection result (i.e., a vibration correction optical system is shifted in a direction that is perpendicular to a light axis) is begun at the full-stroke position for the release button, and the vibration correction, or the vibration detection processing, is halted upon the release of the shutter button. To save power, it is desirable that these vibration correction and detection operations be halted if they are not required.

However, since to halt the vibration correcting process by releasing the shutter button, as is described above, a mechanical detection means (hereinafter means encompasses unit) must be provided that can detect the release of the shutter button, and since a large software capacity is also required for the control process, the manufacturing costs for such cameras are accordingly increased.

As one of the above described vibration correcting units, a unit that shifts a part of a lens system, in consonance with a vibration detection result, in order to prevent image vibration at a film plane is conventionally known.

FIGS. 15, 16A, and 16B are schematic diagrams that depict both a camera that employs a vibration detecting unit and its optical system. In FIG. 15, reference number 61 denotes a camera body; 62, a lens barrel; 63, a rangefinder window; 64, a viewfinder; and 65, a release button.

Angular velocity sensors 66 and 67 are internally provided as vibration detecting means in the camera body 61. With the principal point H of the lens barrel 62 as a reference, the angular velocity sensor 66 detects an angular velocity at which the camera body 61 turns along the Y-axis, while the angular velocity sensor 67 detects an angular velocity at which the camera body 61 turns along the X-axis.

The vibration correction unit employs the data concerning the angular velocities, which are detected by the angular sensors 66 and 67 along the X- and Y-axes, to acquire the direction of image vibration and its velocity relative to a film plane 68.

An optical system of lenses shown in FIGS. 16A and 16B are formed with two zoom lens groups; the first group consists of convex lenses L61 and L62 and the second group is a convex lens L63. A wide-angle optical system is shown in FIG. 16A while a telephoto focal optical system is shown in FIG. 16B.

The convex lens L62 of the first lens group is used as a vibration correcting lens (hereafter referred to as a "vibration correcting lens L62"), and is shifted, in the direction indicated by the arrow A, in consonance with the above described data that reflect the direction and velocity of image vibration at the film plane 68.

The image vibration at the film plane 68 is corrected by selecting the direction and the distance to shift the vibration correcting lens L62.

The convex lens L61 is a focusing lens and is shifted, in the direction indicated by the arrow B, to focus an image. Reference numbers 69A and 69B in FIGS. 16A and 16B denote the sections of a lens shutter 69.

Conventionally, the above described vibration correcting unit initiates vibration detection and vibration correction at the time (1) the exposing process is initiated, (2) the main switch is activated, or (3) the half-stroke position for the release button is reached. Thus, the following problems arise.

When the vibration correction is begun at the same time the exposing process is initiated, sometimes a conventional vibration correcting unit cannot fully compensate for the vibration because of the inertia of the vibration correcting lenses and its driving system.

When a conventional unit begins vibration correction at the time the main switch is activated, or the half-stroke position for the release button is reached, measurement of the light amount and the distance must be performed in addition to the vibration correction. As power consumption is significant, the period of time a battery can be used is not long. Further, the processing ability of a controller must be increased to perform vibration correction.

To resolve these shortcomings, the assignee of the present invention has proposed a vibration correcting unit, in Japanese Patent Application Laid-Open No. 5-134287, that employs vibration control means which initiates a vibration correcting process during the period that begins at the termination of a focusing process by focusing means and ends with the initiation of an exposure process by shutter means.

According to this vibration correcting unit, the vibration control means begins driving the vibration correcting lenses before the exposure process begins, so that the exposure process does not overlap the buildup time for the vibration detecting and correcting processing where the performance is unstable. Therefore, stable vibration correction can be performed while the exposure process is conducted, and the exact correction can be provided.

Since the vibration correcting lenses are driven after the focusing is completed, consumed power is lower than that when the vibration correction is begun at the time of the activation of the main switch or when the half-stroke position for the release button is reached. In addition, as the measurements for the light amount and the distance are also completed, the performance ability of the controller does not have to be increased.

The above described vibration correcting unit is still so designed that the vibration detection and correction are performed after the focusing is terminated and immediately before the exposure process. As well as a conventional unit, this vibration correcting unit cannot correct vibration exactly at which it should be performed: (1) at the same time as the initiation of the exposure, (2) at the time the main switch is activated, and (3) at the time the half-stroke position for the release button is reached. The vibration correcting unit, therefore, still has shortcomings in its ability to provide stable imaging.

It is known that the vibration correcting unit is affected by the inertia of the vibration correcting lenses and its driving system, and that it requires a certain buildup time between the point at which vibration sensors are activated and the point at which they are stabilized.

Regarding the buildup time for the vibration correcting unit for vibration detection and correction, a problem still remains in preventing the initial stage of these processes from overlapping the exposure process. It is currently demanded that an entire processing for a camera, including the actual photographing, be reviewed, and that some countermeasure be provided to ensure that the vibration detection and correction will be performed in a desired state, to ensure that adequate photographing with excellent snapshot performance, in which immediate photographing is enabled, can be provided, and to ensure that a stable image can be acquired.

In the entire processing of a camera including photographing, the replacement of batteries or loading a film results in the photographing in near future. It is desirable that by detecting such information, the preparation for photographing, including the vibration detection and correction, be performed in advance to set the camera on standby. It is necessary to consider this matter.

A camera that reduces red-eye phenomenon is also well known. A camera of this type starts emitting (pre-emitting) light from a red-eye reduction lamp, waits a predetermined time, and then performs a flash exposure with an electronic flash unit. In this manner, as the flash exposure is performed while the pupils of a subject (person) who has been looking at the pre-emitted light are not dilated, the redness in the eyes of the person on a photograph is not outstanding.

Normally, in consonance with the reaching of the full-stroke position for the release button, the above described vibration correcting unit drives the vibration correcting optical system first to the initial position (e.g., a position where the light axis of the vibration correcting optical system corresponds to the light axis of the lens), then shifts it from that position to the position that corresponds to the output of the vibration amount detecting sensor, and performs vibration correction. It is therefore necessary, after the full-stroke position for the release button is reached, that the photographing be delayed at least for the period of time it takes for the vibration correcting optical system to be driven to the original position.

It generally takes from 0.7 to 1 second for the subject to look at the pre-emitted light for the red-eye reduction until the diameter of the pupils reaches the minimum. If no light enters the subject's eyes later, the diameter of the pupils will thereafter gradually increase. To provide a satisfactory red-eye reduction effect, therefore, a standby period of from 0.7 to 1 second is required from the light pre-emittance point until the flash exposure point.

As for a camera that, in consonance with the reaching of the full-stroke position for a release button, drives the lens focusing optical system from its reset position (the withdrawn position) by a predetermined value and performs focusing, as the camera-to-subject distance is shorter, the drive distance for the focusing optical system is increased and the focusing takes more time.

Therefore, the vibration correction function and the red-eye reduction function described above include factors that extend the time between reaching the full-stroke position and the taking of a photograph. If a vibration preventing camera has a red-eye reducing function, pre-emittance of light, focusing, and the operational time of the vibration correcting unit must be considered when the conditions for a flash exposure are established. Otherwise, especially when the camera-to-subject distance is short (the drive distance for the focusing optical system is great), the taking of a photograph is significantly delayed and a good shutter chance is missed. Further, when pre-emittance of light for red-eye reduction is performed by a different lamp than that of an electronic flash unit, the light emittance energy is smaller than that of the electronic flash unit, and thus, as the light emittance period must be extended, the above described shortcomings become more critical.

The applicant of the present invention, therefore, has proposed a vibration preventing camera, in Japanese Patent Application No. 6-11668, wherein the activation of a half-stroke switch is synchronized with the arrival of a shutter release button at a half-stroke position in order to calculate an accurate vibration reference level ($\omega=0$), which is employed to calculate the absolute value of an angular vibration velocity for vibration detection.

In this vibration preventing camera, special consideration is given to the operational order for the pre-emittance of light for red-eye reduction, the focusing of lenses, and the processing of the vibration correcting unit to minimize the time period from the point at which a photographic start signal is output until flash exposure is performed, and satisfactory vibration correction and red-eye reduction can be obtained.

When a photographing procedure, such as at the half-stroke of a shutter release button or upon ON/OFF manipulation of a full-stroke switch, is performed, or when a photographing mode, such as a flash exposure mode that is accompanied by red-eye reduction or a self-timer photographing mode, is performed with the above described vibration preventing camera, not only the accuracy in vibration detection but also the accuracy in vibration correction depends on when the vibration correcting unit is activated and how long it is in operation.

Especially, the operation that is performed after the full-stroke switch is turned on by the full-stroke of the shutter release button is not disclosed at all for the above described vibration preventing camera. Countermeasures concerning how the vibration detection and vibration correction are to be performed after the full-stroke switch is turned on must be taken to improve the vibration accuracy detection and correction, and for the performance of the vibration correction.

SUMMARY OF THE INVENTION

It is an object of the present invention to reduce the power requirements of a vibration preventing camera.

It is another object of the present invention to provide a vibration preventing camera that will not miss opportunities for taking photographs, such as when a self-timer is used.

It is an additional object of the present invention to provide a vibration preventing camera that can halt the vibration correcting operation without requiring new means.

It is a further object of the present invention to employ an optimal value in a photographing sequence as a predetermined time, which is so employed that, without requiring new means, the vibration correcting operation is halted after the predetermined time has elapsed.

It is still another object of the present invention to provide a vibration correcting unit, for a camera, that takes into consideration the start timing for vibration detection and correction relative to the photographing of the camera, improves snapshot performance, and obtains a stable image.

It is a still further object of the present invention to provide a vibration preventing camera that increases vibration detection accuracy and performs exact vibration correction.

To achieve the above described objects, according to a first aspect of the present invention, a vibration preventing camera comprises: vibration amount detecting means for detecting the amount of vibration; vibration correcting means for correcting vibration; light measuring means for measuring the light value at a subject; and control means for controlling the vibration correcting means in consonance with a detection signal that is obtained by the light measuring means and the vibration detecting means, and for activating the vibration detecting means after the length of exposure is determined by the light value at the subject that is obtained by the light measuring means.

The vibration preventing camera further comprises self-timer means, and when the self-timer means is set for an exposure, preferably, the vibration detecting means is activated after the timing count down for the self-timer means begins.

The vibration preventing camera further comprises film sensitivity identifying means for identifying the light sensitivity of loaded film. A required shutter speed is calculated by the light value at a subject that is obtained by the light measuring means and the light sensitivity of the loaded film that is obtained by the film sensitivity identifying means. It is preferable that the vibration detecting means be activated only when the shutter speed is lower than a predetermined value. The vibration preventing camera further comprises focusing distance identifying means for identifying a focusing distance for a mounted lens. A required shutter speed is calculated by the light value reading at a subject that is obtained by the light measuring means and the light sensitivity of the loaded film that is obtained by the film sensitivity identifying means. It is also preferable that the vibration detecting means be activated only when the shutter speed is lower than a required shutter speed that is calculated from the lens focusing distance, which is acquired by the focusing distance identifying means.

In the first aspect of the present invention, since the vibration detecting means is activated only as necessary, i.e., it is activated after the amount of exposure is determined by the light value reading at a subject that is obtained by the light measuring means, it is possible to obtain a significant savings in the amount of power required to operate the vibration preventing camera.

According to a second aspect of the present invention, a vibration preventing camera comprises: vibration amount detecting means for detecting the amount of vibration; vibration correcting means for correcting vibration; control means for controlling the vibration correcting means in consonance with a detection signal that is output by the vibration detecting means; exposure preparing means for starting exposure preparation; and self-timer means whereby the vibration detecting means is activated after the exposure preparing means begins an exposure preparation sequence, with the control means permitting the operation of the detecting means to be continued while the self-timer means is operating.

According to a third aspect of the present invention, a vibration preventing camera comprises: vibration amount detecting means for detecting the amount of vibration; vibration correcting means for correcting vibration; control means for controlling the vibration correcting means in consonance with a detection signal that is output by the vibration detecting means; and self-timer means whereby the vibration detecting means is activated after the an exposure preparation sequence is started by the self-timer means, with the control means permitting the operation of the detecting means to be continued while the self-timer means is operating.

According to a fourth aspect of the present invention, a vibration preventing camera comprises: vibration amount detecting means for detecting the amount of vibration; vibration correcting means for correcting vibration; control means for controlling the vibration correcting means in consonance with a detection signal that is output by the vibration detecting means; and vibration determining means for employing an adjusted exposure value and/or optical system exposure data to determine whether or not vibration is occurring, with the control means activating the vibration detecting means when the vibration determining means determines that vibration is occurring.

According to a fifth aspect of the present invention, a vibration preventing camera comprises: vibration amount detecting means for detecting the amount of vibration; vibration correcting means for correcting vibration; control means for controlling the vibration correcting means in consonance with a detection signal that is output by the vibration detecting means; a self-timer means; and vibration determining means for employing an adjusted exposure value and/or optical system exposure data to determine whether or not vibration is occurring, with the control means activating the vibration detecting means when the vibration determining means ascertains that vibration is occurring, regardless of the timing for the exposure by the self-timer.

Said control means preferably continues the operation of the vibration detecting means while the self-timer means is operating.

According to the second through fifth aspects of the present invention, since the vibration detecting means is activated after the exposure preparing means (e.g., by a half-stroke switch) is in operation, the activation of the vibration correcting means is performed only as necessary, and a significant saving in power can thus be accomplished. Further, because the vibration detecting means is activated after the exposure preparing means is in operation, the time for the period before the exposure setting can be shortened and a shutter chance will not be missed.

For self-timer photography, the operation of the vibration correcting means is continued while the self-timer is operating, in order that the delay for the exposure can be minimized and opportunities for taking photographs will not be missed.

In addition, the vibration determining means employs the adjusted exposure value (e.g., a shutter speed) and the optical system information (e.g., a lens focusing distance) to determine whether or not vibration is occurring. Only when the vibration determining means determines that vibration is occurring, the vibration detecting means is activated, and thus a greater amount of power can be saved.

According to a sixth aspect of the present invention, a vibration preventing camera comprises: vibration amount detecting means for detecting an amount of vibration and outputting a detection signal based on the detection result; vibration correcting means for correcting vibration in response to the detection signal that is transmitted from the vibration detecting means; control means for controlling the activation of the vibration correcting means; a timer for timing a predetermined period of time; and halting means for halting the vibration correcting process performed by the vibration correcting means after a predetermined time, which is timed by the timer, has elapsed following the activation of the vibration correcting means.

It is preferable that the timing for a predetermined period be begun when the full-stroke position for a shutter release member is reached, or after the termination of timing by the self-timer.

The vibration preventing camera further comprises exposure control means for controlling the exposure operation. It is preferable that the halting means halts the vibration correcting operation which is performed by the vibration correcting means, after a specified period of time has elapsed that is longer than the maximum period that can be controlled by the exposure control means.

Further, the vibration correcting means outputs a start signal as the vibration correction is begun. The vibration preventing camera further comprises: first and second timers for starting the timing in response to the start signal; focusing means for focusing by shifting a focus lens; and feeding means for advancing film. The first timer times a predetermined period that continues until the vibration correcting process is halted. The second timer times a predetermined period that continues until the focusing means begins to return a focusing lens or until the feeding means starts to advance one frame of film. The time period that the second timer times is set so that it is longer than that for the first timer.

According to the sixth aspect of the present invention, since the vibration correcting process performed by the vibration correcting means is halted after the elapse of a predetermined time, which is timed by a timer, following the activation of the vibration correcting means, a new member is not required and the software capacity does not have to be increased. Accordingly, manufacturing costs will not rise.

The vibration preventing camera also comprises exposure control means that controls the exposure process. The halting unit stops the vibration correction performed by the vibration correcting means at the end of a period of time that is longer than the maximum time that can be controlled by the exposure control means, so that a predetermined timing value can be set as the optimal value for the exposure process.

In addition, since a period of time until the returning process of a focusing lens and the feeding process for one frame of film are set longer than a period until the vibration correction process is halted, the vibration correction is not performed at the same time as the focusing returning and the film feeding, and it is not necessary to perform high-current control.

According to a seventh aspect of the present invention, a vibration preventing device comprises: distance measuring means for measuring a distance to a subject; focusing means for performing focusing based on the result obtained by the distance measuring means; shutter means for controlling an exposure time; vibration amount detecting means for detecting an amount of vibration at a film plane; vibration correcting means for driving a vibration preventing lens based on the result obtained by the vibration detecting means in order to prevent image vibration; battery presence detecting means for detecting the presence of a battery and/or film presence detecting means for detecting the presence of film; and control means for activating the vibration correcting means in response to a detection signal from the battery/film presence detecting means.

It is preferable that the battery presence detecting means detects the presence of a battery when a battery cover is opened and closed for loading the battery, and that the film presence detecting means detects the presence of film when the removing and loading of the film is accompanied with the opening and closing of a camera back cover.

Further, the vibration detecting means is preferably so designed that it can detect an amount of vibration by employing an angular velocity sensor.

According to the seventh aspect of the present invention, the loading of a battery or of film, following which it is inferred that photographing may be expected immediately, is detected from information that is obtained, for example, when the state of a battery cover switch that is employed for battery presence detection is changed from OFF to ON, or when the state of a back cover switch that is employed for film presence detection is changed from OFF to ON. In consonance with the detection result, the vibration correcting unit is activated before an exposure, so that the initial stage of vibration detection and correction that is not yet properly functioning will not overlap the exposure process.

More specifically, according to the seventh aspect of the present invention, the vibration detection and correction are initiated (1) when the replacement of batteries is confirmed, (2) when the loading of film is confirmed by the opening and closing of a back cover, (3) when the tripping of a shutter is confirmed, (4) when the turning on of a main switch is confirmed, and (5) when the ON state of the half-stroke switch for a release button is confirmed. Even when the vibration detection or correction is begun under one of the conditions (1) to (5), if the half-stroke switch for a release button is not placed in the ON state after a predetermined time has elapsed immediately following the activation, the vibration detection is halted.

According to an eighth aspect of the present invention, a vibration preventing camera comprises: vibration amount detecting means for detecting an amount of vibration; vibration reference level calculating means for calculating a vibration reference level in consonance with a detection signal from the vibration detecting means; vibration correcting means for correcting vibration; a first switch for activating the vibration detecting means; and a second switch for activating the vibration correcting means, with the vibration reference level calculating means being operated until the second switch is turned on at a time after the first switch is turned on.

The vibration preventing camera further comprises red-eye reduction pre-irradiating means for pre-emitting light before actual exposure to avoid a red-eye phenomenon. It is desirable that the vibration reference level calculating means be so designed that it can be operated even during pre-irradiation.

The vibration preventing camera further comprises self-timer means for performing an exposure that is controlled by a self-timer. It is desirable that the reference level calculating means be so designed that it can be operated while the self-timer is operating, and that the self-timer means be started by an ON signal from the second switch.

It is preferable that the vibration detecting means be powered off when the first switch is turned off.

The vibration preventing camera further comprises distance measuring means for measuring a distance to a subject. It is preferable that the distance measuring means outputs a measured result once during a period that begins when the first switch is turned on and ends when the second switch is turned off.

It is desirable that the reference level calculating means be so designed that it can be halted before the activation of the vibration correcting means.

According to the eighth aspect of the present invention, the vibration detecting means is powered on by the ON state of the half-stroke switch of a release button, that is, the first switch, and sampling of a sensor signal is begun to detect a vibration reference level ($\omega=0$). When it is confirmed that a full-stroke switch that serves as the second switch is turned on after a predetermined time has elapsed, sampling is terminated, the vibration reference level is calculated, the amount of vibration for a camera is determined, and, in consonance with this result, the vibration correcting operation is begun. Even when the half-stroke state for a release button continues very long, since sampling for the detection of the vibration reference level is continued until immediately before the full-stroke switch is turned on, the detection of the amount of vibration occurring immediately before the exposure is possible, and the vibration can be properly corrected.

For stroboscopic exposure that accompanies pre-irradiation for red-eye reduction, for example, sampling for detection of the vibration reference level is continued even during the pre-irradiation. Since the sampling is continuously performed, even during the pre-irradiation of about 0.7 seconds for red-eye reduction, the exact vibration occurring immediately before exposure can be detected, and accordingly, the vibration can be properly corrected.

For an exposure that is controlled by the self-timer, sampling for detection of the vibration reference level is continued during the timing sequence. Since the sampling is continuously performed, even while the self-timer is in operation, the exact vibration immediately before an exposure can be detected even when, for example, a less rigid tripod is used, and accordingly, the vibration correction can be performed under the required conditions.

The above and other objects, features and advantages of the present invention are explained hereinafter and may be better understood by reference to the drawings and the descriptive matter which follows.

DETAILED DESCRIPTION OF PREFERRED EMBODIMENTS

Figure 1:
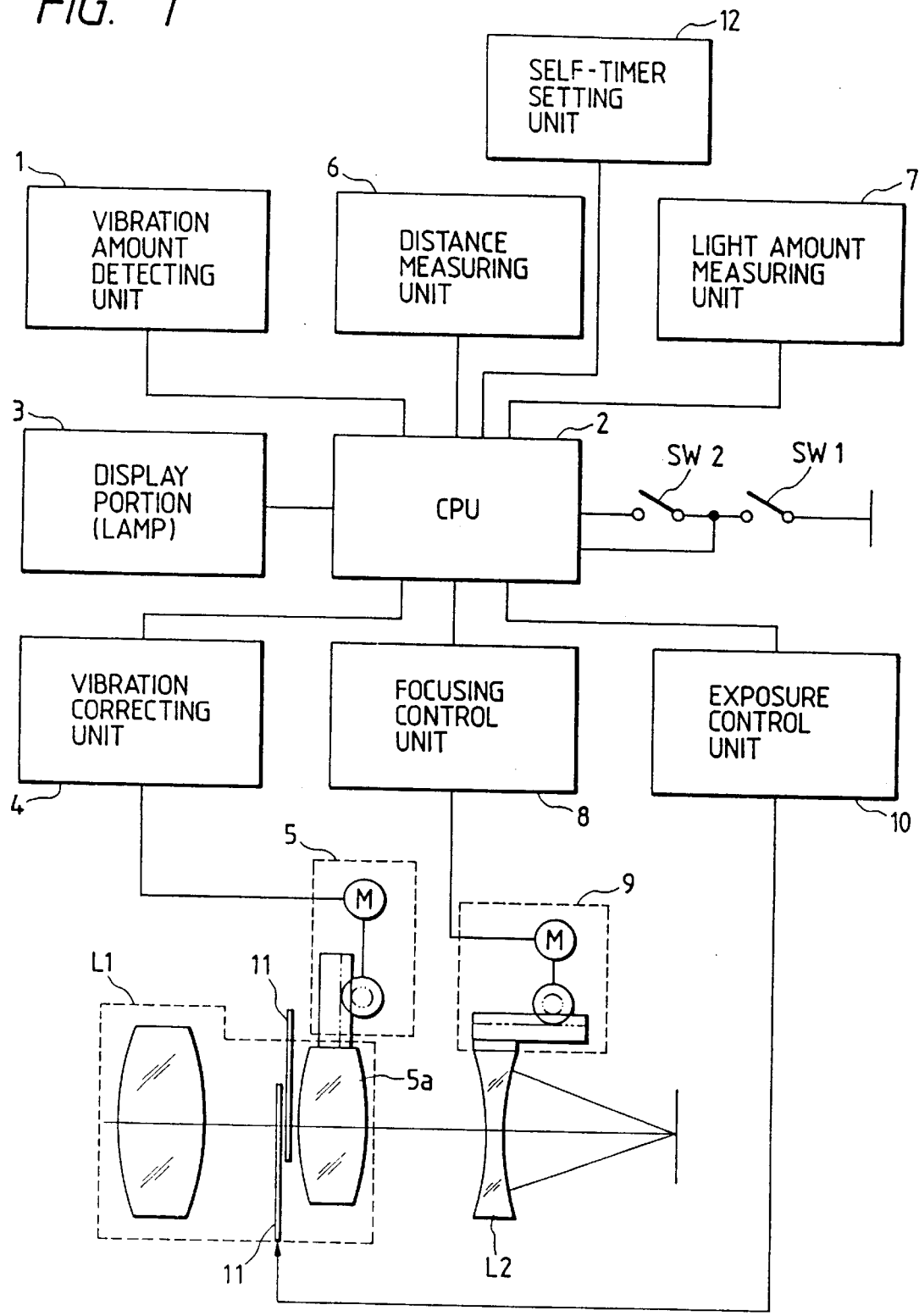
FIG. 1 is a schematic block diagram illustrating the basic arrangement of a vibration preventing camera according to one embodiment of the present invention.

FIG. 1 is a schematic block diagram illustrating the basic structure of a vibration preventing camera according to one embodiment of the present invention.

In FIG. 1, an optical system consists of lenses L1 and L2. The lens L2 is shifted in the direction of a light axis by a motor in a focusing drive unit 9, and its focus is adjusted on a film plane. A vibration correcting lens group 5a, which is part of the lens L1, is movable, by a motor in a lens control unit 5, in two directions perpendicular to the light axis. The vibration correcting lens group 5a is shifted in the direction opposite to that in which a camera is vibrated during the exposure, so that the vibration of an image to be exposed on a film can be reduced. An aperture member (shutter) 11 is located in front of the vibration correcting group 5a (on a subject side).

Based on a signal from a vibration amount detecting unit, a CPU 2, which controls the entire camera, transmits the amount of correction to a vibration correcting unit 4. The distance to a subject is measured by a distance measuring unit 6, the CPU 2 transmits the measurement result to a focusing control unit 8 and the focusing drive unit 9 drives the lens L2. The light value at the subject is measured by a light amount measuring unit 7, the CPU 2 calculates an exposure value, and an exposure control unit 10 controls the shutter 11.

A display portion 3, which is an LED, etc., displays the state of a camera. Switches SW1 and SW2 are button depression switches that constitute a release button. A half-stroke renders the switch SW1 on and a full-stroke renders the switches SW1 and SW2 on. A self-timer setting unit 12 sets a self-timer mode and initiates the time count of a self-timer (not shown) by turning on the switches SW1 and SW2 (at the full-stroke of the shutter button).

Figure 2:
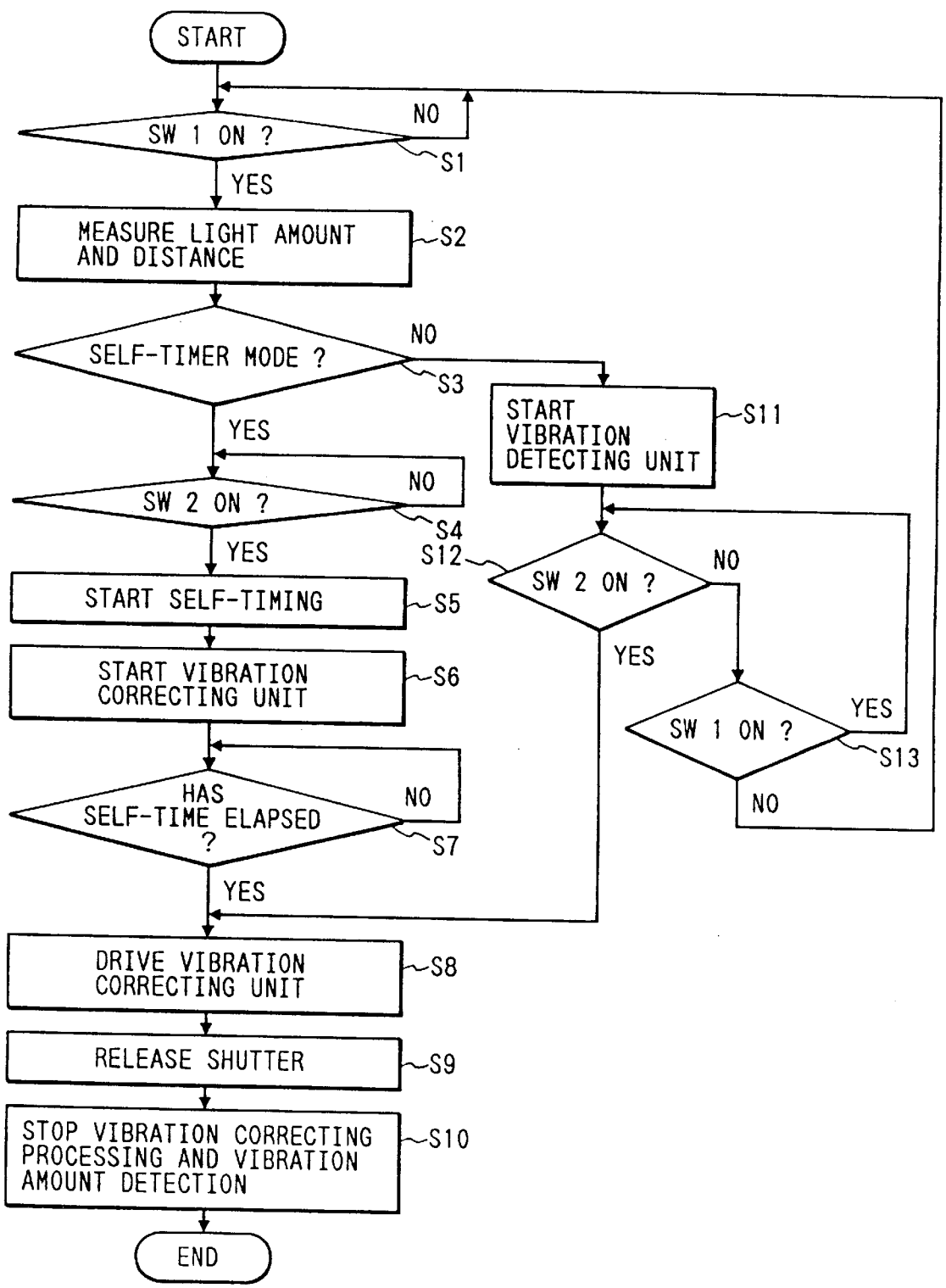
FIG. 2 is a flowchart showing a first example process routine performed by a CPU 2 in FIG. 1.

FIG. 2 is a flowchart showing a first example process routine performed by the CPU 2.

When the program is begun, at step S1 a check is performed to determine whether or not a release button is in the half-stroke state (whether or not the SW1 is in the ON state). If the release button is not in the half-stroke state, program control returns to step S1. If the release button is in the half-stroke state, light value and distance are measured at step S2. At step S3, a check is performed to determine whether or not a self-timer mode is set.

If, at step S3, the mode is not a self-timer mode, the vibration amount detecting unit 1 is activated at step S1. When the vibration amount detecting unit 1 is activated at step S1, a check is then performed at step S12 to determine whether or not the release button has been depressed by a full-stroke (the switch SW2 is turned on), and program control waits until the release button is pressed (steps S12 and S13). When the switch SW2 is turned on, program control moves to step S8, where the vibration correcting unit 4 is activated. When the switches SW1 and SW2 are both turned off, program control returns to step S1.

If, at step S3, the mode is a self-timer mode, program control advances to step S4. A check is then performed to determine whether or not the release button has been depressed by a full-stroke (the switch SW2 is turned on), and program control waits until the switch SW2 is turned on. When the switch SW2 is turned on, program control moves to step S5, where the timing by a self-timer is begun. The vibration amount detecting unit 1 is activated at step S6, and an elapsed time for the self-timer is examined at step S7. When a predetermined time has elapsed, the vibration correcting unit 4 is activated at step S8 and the shutter 11 is opened at step S9 for an exposure. Finally, the vibration correction process and vibration amount detection process are halted at step S10, and the program is thereafter terminated.

Figure 3:
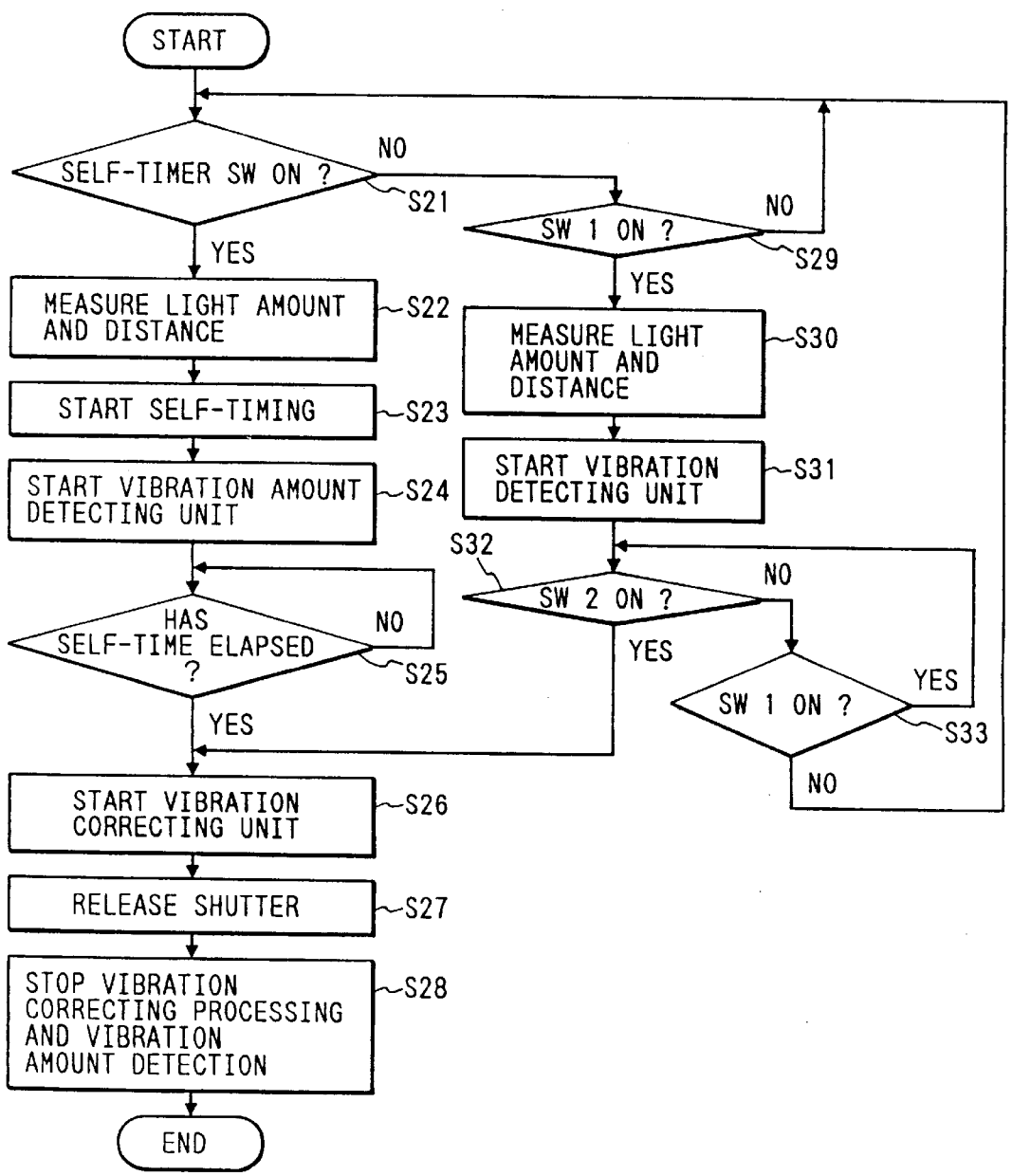
FIG. 3 is a flowchart showing a second example process routine performed by the CPU 2 in FIG. 1.

FIG. 3 is a flowchart showing a second example process routine performed by the CPU 2. While, in the flowchart (FIG. 2) for the first embodiment, the self-timer is started after the self-timer mode is set and the SW2 is turned on, in a second embodiment, the timing procedure is initiated at the same time the switch of the self-timer is turned on.

When a program is started, a check is performed at step S21 to determine whether or not the start switch (not shown) of the self-timer is turned on. When the start switch of the self-timer is on, light value and distance are measured at step S22, and the timing by the self-timer is begun at step S23. The vibration amount detecting unit 1 is activated at step S24, and an elapsed time for the self-timer is examined at step S25. When a predetermined time has elapsed, the vibration correcting unit 4 is activated at step S26 and the shutter 11 is opened at step S27 for an exposure. Finally, the vibration correction process and the vibration amount detection process are halted at step S28, and the program is thereafter terminated.

If, at step S21, the start switch of the self-timer is in the OFF state, the state of the SW1 is determined at step S29. When the SW1 is turned on, program control moves to step S30. If the SW1 remains in the OFF state, program control returns to step S21. Light value and distance are measured at step S30, and the vibration amount detecting unit 1 is activated at step S31. At step S32, a check is performed to determine whether or not the release button has been depressed by a full-stroke (the switch SW2 is turned on), and program control waits until the release button is pressed (steps S32 and S33). When the switch SW2 is turned on, program control goes to step S26, where the vibration correcting unit 4 is activated. When the switches SW1 and SW2 are turned off, program control returns to step S21.

Figure 4:
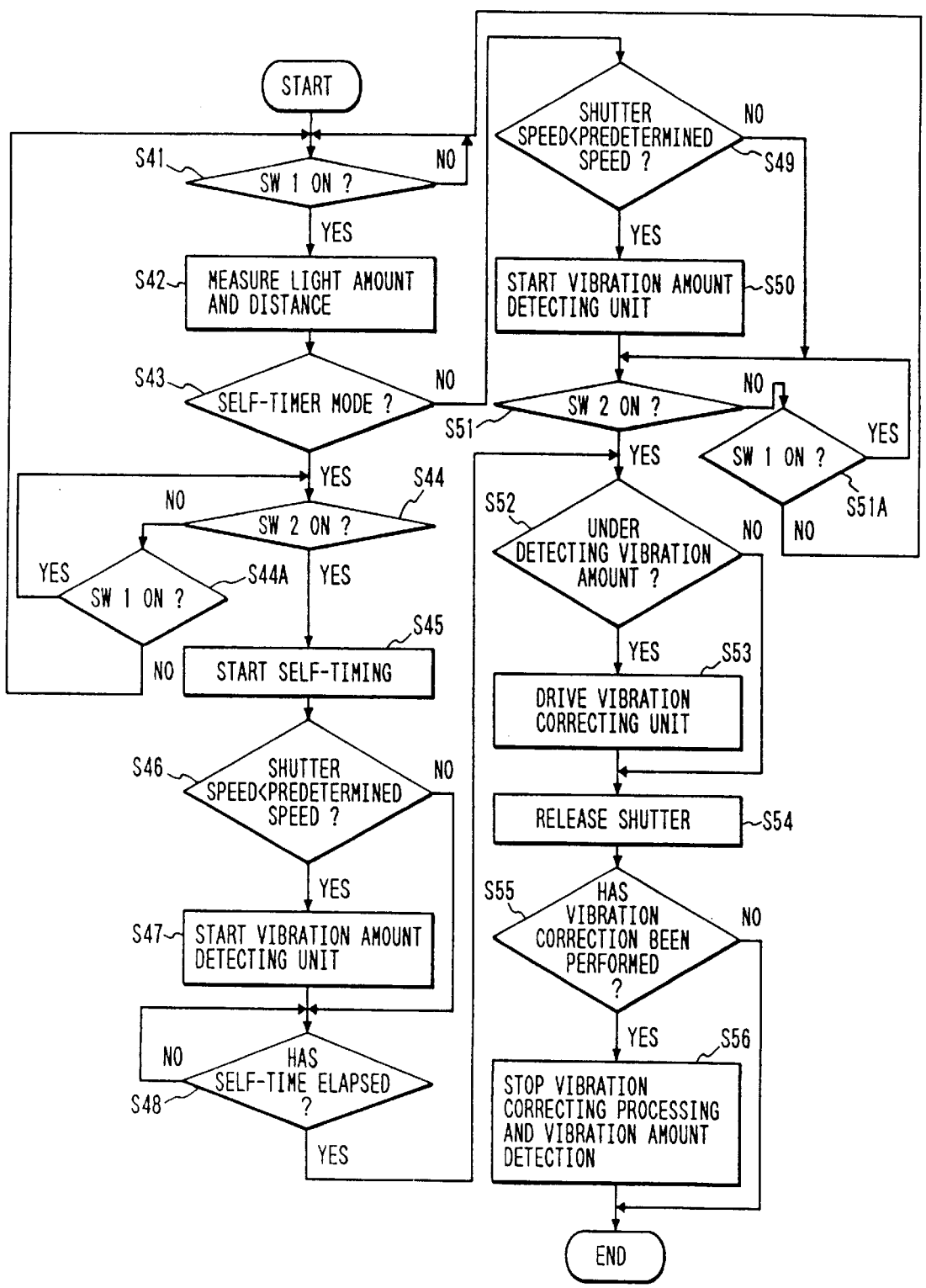
FIG. 4 is a flowchart showing a third example process routine performed by the CPU 2 in FIG. 1.

FIG. 4 is a flowchart showing a third example process routine performed by the CPU 2.

When a program is begun, at step S41 a check is performed to determine whether or not a release button is in the half-stroke state (whether or not the SW1 is in the ON state). If the release button is not in the half-stroke state, program control returns to step S41. If the release button is in the half-stroke state, light value and distance are measured at step S42. At step S43, a check is performed to determine whether or not a self-timer mode is set.

If, at step S43, the mode is a self-timer mode, program control moves to step S44. A check is then performed to determine whether or not the release button has been depressed by a full-stroke (whether or not the switch SW2 is in the ON state), and program control waits until the switch SW2 is turned on (steps S44 and S44A). When the switch SW2 is turned on, the timing by the self-timer is initiated at step S45. A check is performed to determine whether or not a shutter speed is slower than a predetermined speed. If, at step S46, the shutter speed is faster than the predetermined speed, the elapsed time for the self-timer is examined at step S48. When a predetermined time has elapsed, program control moves to step S53, which will be described later. If, at step S46, the shutter speed is slower than the predetermined speed, at step S47 the vibration amount detecting unit 1 is activated and detects the amount of vibration. Program control then goes to step S48. At step 48, the elapsed time for the self-timer is examined. When a predetermined time has elapsed, program control moves to step S52, which will be described later.

When, at step S43, the mode is not a self-timer mode, at step S49, a check is performed to determine whether or not a shutter speed is slower than a predetermined speed. If, at step S49, the shutter speed is faster than the predetermined speed, program control moves to step S51, which will be described later. If, at step S49, the shutter speed is slower than the predetermined speed, at step S50 the vibration amount detecting unit 1 is activated and detects the amount of vibration. Program control then goes to step S51. At step S51, a check is performed to determine whether or not the release button has been depressed by a full-stroke (whether or not the switch SW2 is turned on), and program control waits until the SW2 is turned on (steps S51 and S51A).

When the SW2 is turned on, at step S52 a check is performed to determine whether or not the amount of vibration is being detected. When the amount of vibration is not being detected, program control moves to step S54. When the amount of vibration is being detected, the vibration correcting unit 4 is activated at step S53 and then program control goes to step S54. The shutter 11 is opened at step S54 for an exposure, and a check is performed at step S55 to determine whether or not the vibration has been corrected. If the vibration correction has not been performed, the program is immediately terminated. If the vibration has been corrected, the vibration correction process and the vibration amount detection process are halted at step S56. The program is thereafter terminated.

The third example routine as described above is provided by adding the determination of the light value measurement result to the first example routine. A shutter speed is examined at steps S46 and S49. When vibration correction is required for the shutter speed, the amount of vibration is detected at steps S47 and S60. The vibration is corrected at step S53, which occurs in advance of the shutter release at step S54.

When the light value reading at a subject is high enough and a shutter can be closed at high speed, neither the vibration amount detecting unit 1 nor the vibration correcting unit is activated, so that power can be saved. The shutter speed is calculated from the measured light value at the subject, and the resultant value is employed to determine whether or not the activation of the vibration amount detecting unit 1 and the vibration correcting unit 4 is necessary. Generally, since vibration tends to occur at a shutter speed that is lower than that which is required for a lens focusing distance, when a zoom lens is employed for photography, the focusing distance and the shutter speed may be referred to in order to determine whether to activate the vibration amount detecting unit 1 and the vibration correcting unit 4.

According to the first through third process routines performed by the CPU 2, since the vibration amount detecting unit is activated after the light value has been measured (after the self-timer has begun the timing when it is in use), a comparatively large reduction in the operating period for the vibration amount detecting unit 1 can be realized, and power can be saved. If the shutter speed, which is obtained from the measured light value, is so high that vibration can be avoided without requiring a vibration preventing mechanism, the vibration amount detecting unit 1 is not activated. Otherwise, whether or not the vibration amount detecting unit 1 should be activated is determined by employing a shutter speed and a lens focusing distance. By eliminating the unnecessary activation of a vibration preventing mechanism, a greater savings in power is provided.

Figure 5:
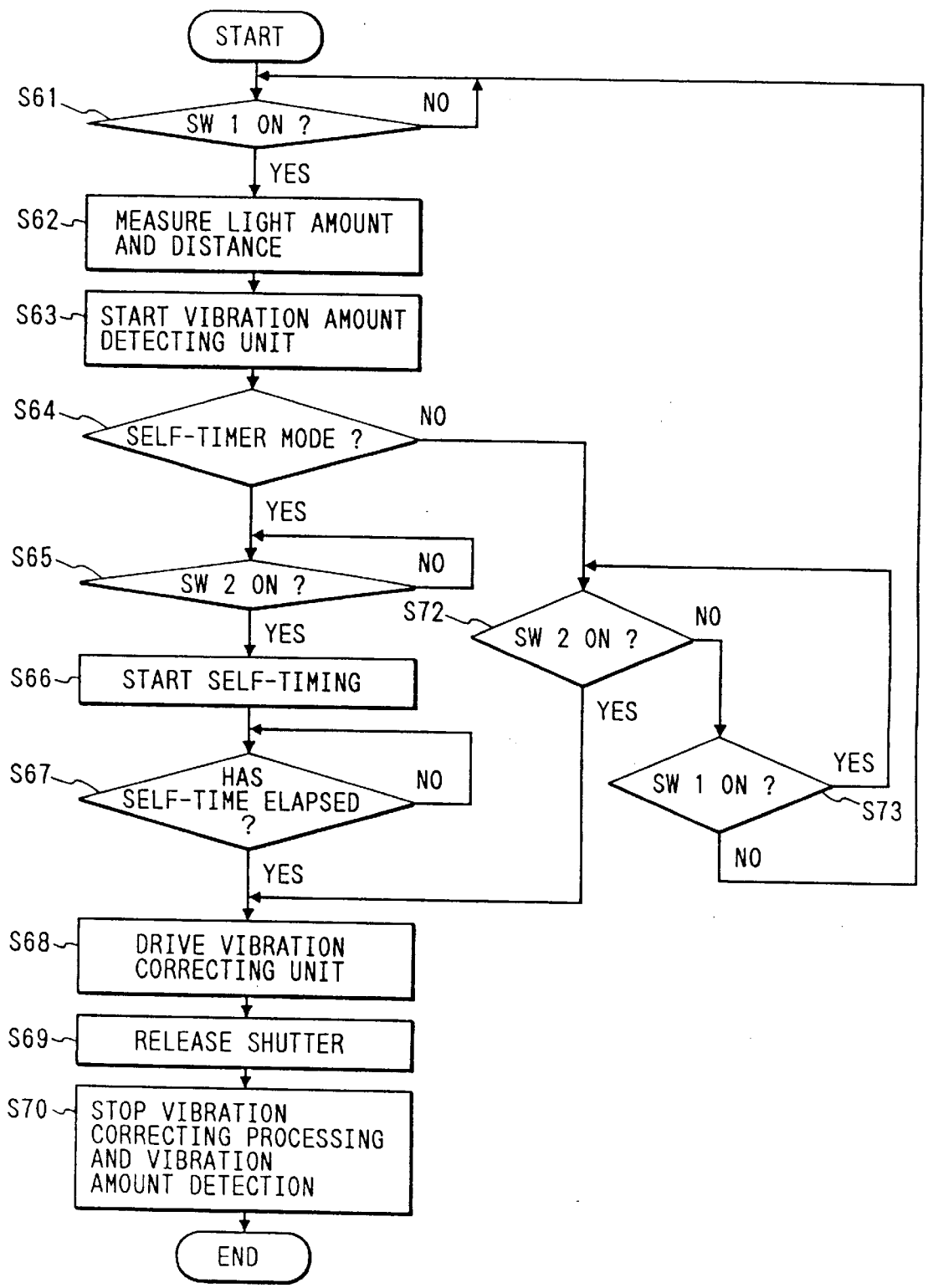
FIG. 5 is a flowchart showing a fourth example process routine performed by the CPU 2 in FIG. 1.

FIG. 5 is a flowchart showing a fourth example process routine performed by the CPU 2.

When a program is begun, at step S61 a check is performed to determine whether or not a release button is in the half-stroke state (whether or not the switch SW1 is in the ON state). If the release button is not in the half-stroke state (in the ON state of the switch SW1), program control returns to step S61. If the release button is in the half-stroke state, light value and distance are measured at step S62. Then, at step S63, the vibration amount detecting unit 1 is activated.

At step S64, a check is performed to determine whether or not a self-timer mode is set. If the mode is a self-timer mode, at step S72 a check is performed to determine whether or not the release button has been depressed by a full-stroke (whether or not the switch SW2 is in the ON state), and program control waits until the SW2 is turned on (steps S72 and S73). When the switch SW2 is turned on, program control moves to step S68 where the vibration correcting unit 4 is activated. When the switches SW1 and SW2 are turned off, program control returns to step S61.

If, at step S64, the mode is a self-timer mode, program control advances to step S65. A check is then performed to determine whether or not the release button has been depressed by a full-stroke (the SW2 is turned on), and program control waits until the SW2 is turned on. When the SW2 is turned on, program control moves to step S66, where the timing by a self-timer is begun. An elapsed time for the self-timer is examined at step S67. When a predetermined time has elapsed, the vibration correcting unit 4 is activated at step S68 and the shutter 11 is opened at step S69 for an exposure. It should be noted that vibration detection is continuous while the timing is being performed by the self-timer.

Finally, the vibration correcting process and vibration amount detecting process are halted at step S70, and the program is thereafter terminated.

Figure 6:
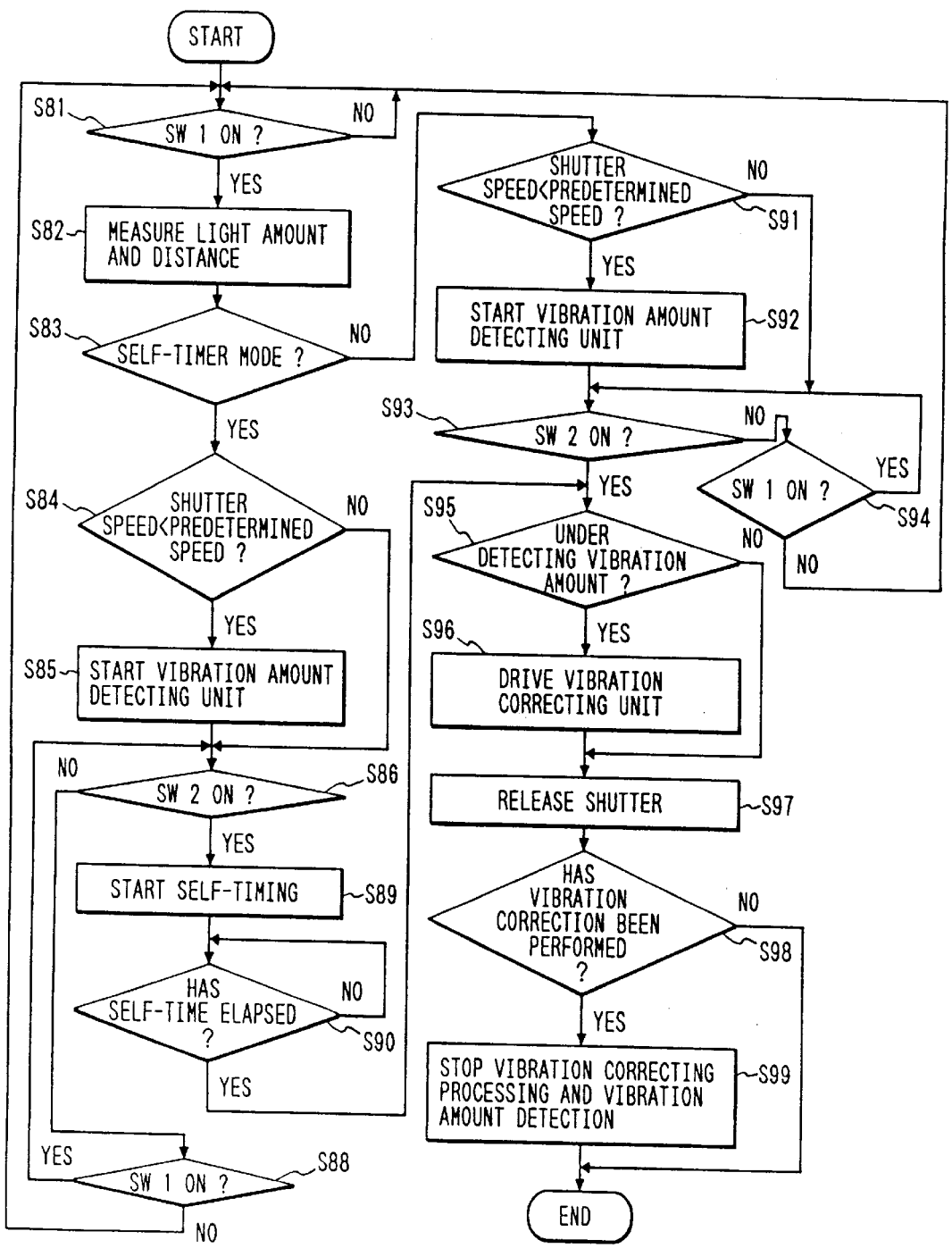
FIG. 6 is a flowchart showing a fifth example process routine performed by the CPU 2 in FIG. 1.

FIG. 6 is a flowchart showing a fifth example process routine performed by the CPU 2.

When a program is begun, at step S81 a check is performed to determine whether or not a release button is in the half-stroke state (whether or not the switch SW1 is in the ON state). If the release button is not in the half-stroke state (in the ON state of the SW1), program control returns to step S81. If the release button is in the half-stroke state, program control goes to step S82 where light value and distance are measured.

At step S83, a check is performed to determine whether or not a self-timer mode is set. When, at step S83, the mode is a self-timer mode, program control advances to step S84. At step S84, a check is performed to determine whether or not a shutter speed is slower than a predetermined speed. If the shutter speed is slower than the predetermined speed, at step S85 the vibration amount detecting unit 1 is activated. If the shutter speed is faster than the predetermined speed, program control moves to step S86.

At step S86, a check is performed to determine whether or not the release button has been depressed by a full-stroke (whether or not the switch SW2 is turned on), and program control waits until the switch SW2 is turned on (steps S86 and S88). When the SW2 is turned on, program control advances to step S89 where the timing by the self-timer is begun. At step S90, the elapsed time for the self-timer is examined. When a predetermined time has elapsed, program control moves to step S95, which will be described later.

When, at step S83, the mode is not a self-timer mode, program control moves to step S91. At step S91, a check is performed to determine whether or not a shutter speed is slower than a predetermined speed. If the shutter speed is slower than the predetermined speed, at step S92 the vibration amount detecting unit 1 is activated. If the shutter speed is faster than the predetermined speed, program control moves to step S93.

At step S93, a check is performed to determine whether or not the release button has been depressed by a full-stroke (whether or not the SW2 is turned on), and program control waits until the SW2 is turned on (steps S93 and S94).

At step S95 a check is performed to determine whether or not the amount of vibration is being detected. When the amount of vibration is not being detected, program control moves to step S97. When the amount of vibration is being detected, the vibration correcting unit 4 is activated at step S96 and then program control goes to step S97. The shutter 11 is opened at step S97 for an exposure, and a check is performed at step S98 to determine whether or not the vibration has been corrected. If the vibration has been corrected, the vibration correcting process and the vibration amount detection are halted at step S99. The program is thereafter terminated.

The fifth example routines described above is provided by adding the determination of the light value measurement result to the fourth example routine. A shutter speed is examined at steps S84 and S91. When the vibration correction is necessary for the shutter speed, the amount of vibration is detected at steps S85 and S92. The vibration is corrected at step S96, which occurs in advance of the shutter release at step S97.

More specifically, when the light value reading at a subject is high enough and a shutter can be closed at high speed, neither the vibration amount detecting unit 1 nor the vibration correcting unit is activated so that power can be saved. The shutter speed is calculated from the measured light value at the subject, and the resultant value is employed to determine whether or not the activation of the vibration amount detecting unit 1 and the vibration correcting unit 4 is necessary.

Generally, since vibration tends to occur at a shutter speed that is slower than that which is required for a lens focusing distance, when a zoom lens is employed in photography, the focusing distance and the shutter speed may be referred to in order to determine whether to activate the vibration amount detecting unit 1 and the vibration correcting unit 4.

According to the fourth and fifth example process routines performed by the CPU 2, since the vibration amount detecting unit is activated by the half-stroke of a release button that starts light and distance measurements, the power that is saved is greater than that which is saved when the vibration amount detecting unit 1 is activated by turning on the power switch.

According to the fifth example, if the shutter speed, which is obtained from the measured light value, is so fast that vibration can be avoided without requiring a vibration preventing mechanism, the vibration amount detecting unit 1 is not activated. Otherwise, whether or not the vibration amount detecting unit 1 should be activated is determined by employing a shutter speed and a lens focusing distance. By eliminating the unnecessary activation of a vibration preventing mechanism, a greater savings in power is provided.

Figure 7:
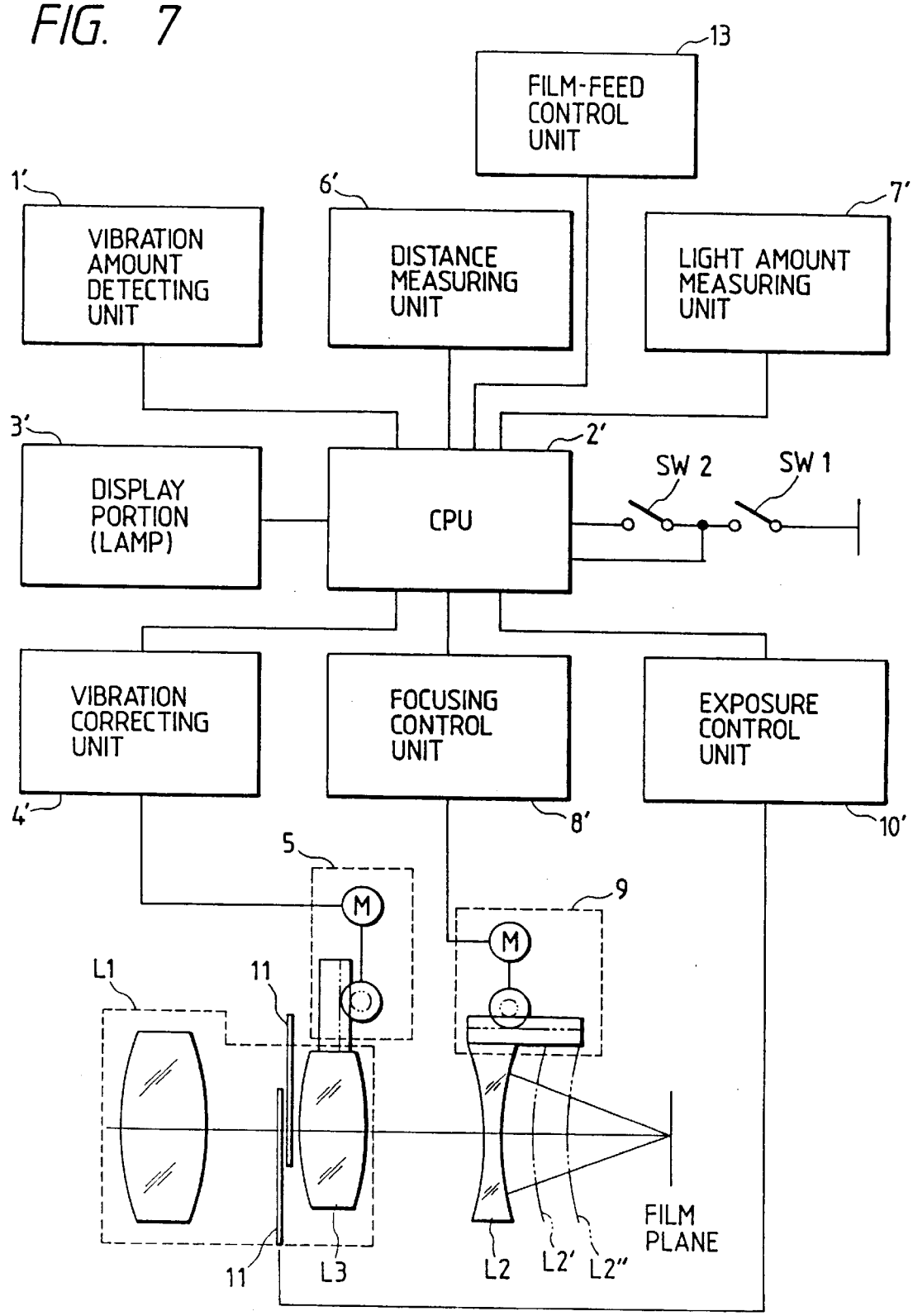
FIG. 7 is a schematic block diagram illustrating the basic arrangement of a modification of the vibration preventing camera in FIG. 1.

FIG. 7 is a schematic block diagram illustrating the basic arrangement of a modification of the vibration preventing camera shown in FIG. 1.

A vibration amount detecting unit 1' is vibration amount detecting means for detecting the amount of vibration that accompanies the supporting of a camera by a user's hands. With the half-stroke depression of an operational member, such as a shutter release button (not shown) that is provided on the top surface of the camera, a half-stroke switch SW1 is turned on and a CPU 2' mounted in the camera activates the vibration amount detecting unit 1', which begins the sampling of a sensor signal to calculate the vibration detection reference level that is employed to detect the amount of vibration. The CPU 2' is employed as vibration detection control means together with the half-stroke switch SW1 of the release button. The CPU 2' includes three timers. One of the timers is a timer (hereafter referred to as a first timer) that begins the timing for a predetermined period when the ON state is set by a full-stroke switch SW2. After a predetermined time for the first timer has elapsed, the vibration correcting process is halted. Another timer (a second timer) is one that begins the timing for a predetermined period when the ON state is set by the full-stroke switch SW2 while in a self-timer mode. After the predetermined time for the second timer has elapsed, shutter release (exposure) is performed. The last timer (a third timer) is one that begins the timing for a predetermined period when the ON state is set by the full-stroke switch SW2. After the predetermined time for the third timer has elapsed, the focusing return process and the winding of one film frame are performed. The halting and the display of the vibration correcting process, the focusing return process, and the winding of one film frame will be described later.

Further, a display portion 3' may be a green lamp in a view finder. In consonance with the activation of the vibration amount detecting unit 1' and the output signal of the vibration amount detecting unit 1', the CPU 2' permits the lamp 3' either to blink or to be continuously lighted. More specifically, with a half-stroke of the release button, the vibration amount detecting unit 1' is activated and the CPU 2' permits the lamp 3' to blink. After a predetermined time has elapsed, when the amount of vibration of the camera that is indicated by the detection signal from the vibration amount detecting unit 1' is smaller than a predetermined amount, the CPU 2' lights the lamp 3'. The blinking or turning on of the lamp 3' permits a photographer to judge whether or not it is the proper time to take a photograph. The display portion 3' is not necessarily a green lamp in the viewfinder; it may be a lamp that is provided on the camera back and is located near a viewfinder.

A vibration correcting unit 4' is provided inside the camera. The following processing has been explained hereinabove. With a full-stroke depression of a shutter release button (not shown), the full-stroke switch SW2 is turned on, and the CPU 2' instructs the vibration correcting unit 4' to perform the vibration correction by employing the detection result (the amount of vibration) obtained by the vibration amount detecting unit 1'. The vibration correcting unit 4' drives a drive system 5 in a part (vibration correcting optical system L3) of a photographic optical system L1 in order to shift the vibration correcting optical system L3 in the up and down direction in the diagram (a direction that is perpendicular to a light axis), and the vibration of the photographic optical system can be corrected for a subject image on a film plane. Then, the lens drive unit 5 is halted after a predetermined time (timed by the first timer) has elapsed.

A distance measuring unit 6' provides information that corresponds to the distance to a subject, and a light measuring unit 7' obtains the light value at a subject. In response to a half-stroke of the shutter release button (SW1 ON), the CPU 2' activates the distance measuring unit 6' and the light measuring unit 7', which in turn measure the distance and the amount of light, respectively.

In consonance with an output (distance measurement) signal from the distance measuring unit 6', the CPU 2' informs a focusing control unit 8' of a predetermined lens position (automatic focusing). In response to this command, the focusing control unit 8' drives a focusing optical system (focusing lens) L2 via its focusing drive unit 9 (focusing drive unit) to shift the lens L2 to the predetermined position.

In consonance with an output (light measurement) signal from the light measuring unit 7', the CPU 2' instructs an exposure control unit 10' to set an aperture size that corresponds to an aperture value. In response to this command, the exposure control unit 10' drives an aperture member (shutter) 11 to control the exposure.

A film-feed control unit 13 performs the automatic idle feeding after a film is loaded, the one-frame winding after a one-frame exposure is completed, the automatic rewinding when all frames have been exposed, and optional rewinding when not all the frames have been exposed.

A self-timer function (mode) can be set for the camera in this modification. This setting is done by the CPU 2'. When the self-timer mode is set, the full-stroke switch SW2 is turned on for the timing of a predetermined period (by the second timer), and at the end of the predetermined period, the shutter release (exposure) is performed. When the timing is initiated, a display portion (not shown) that is visible from outside is lighted to indicate that the camera is set in the self-timer mode. When the timing is terminated, the display portion is turned off, and the shutter release (exposure) follows. If the lamp 3' is so designed to be visible from outside, the lamp 3' may also be employed as the display portion.

Figure 8:
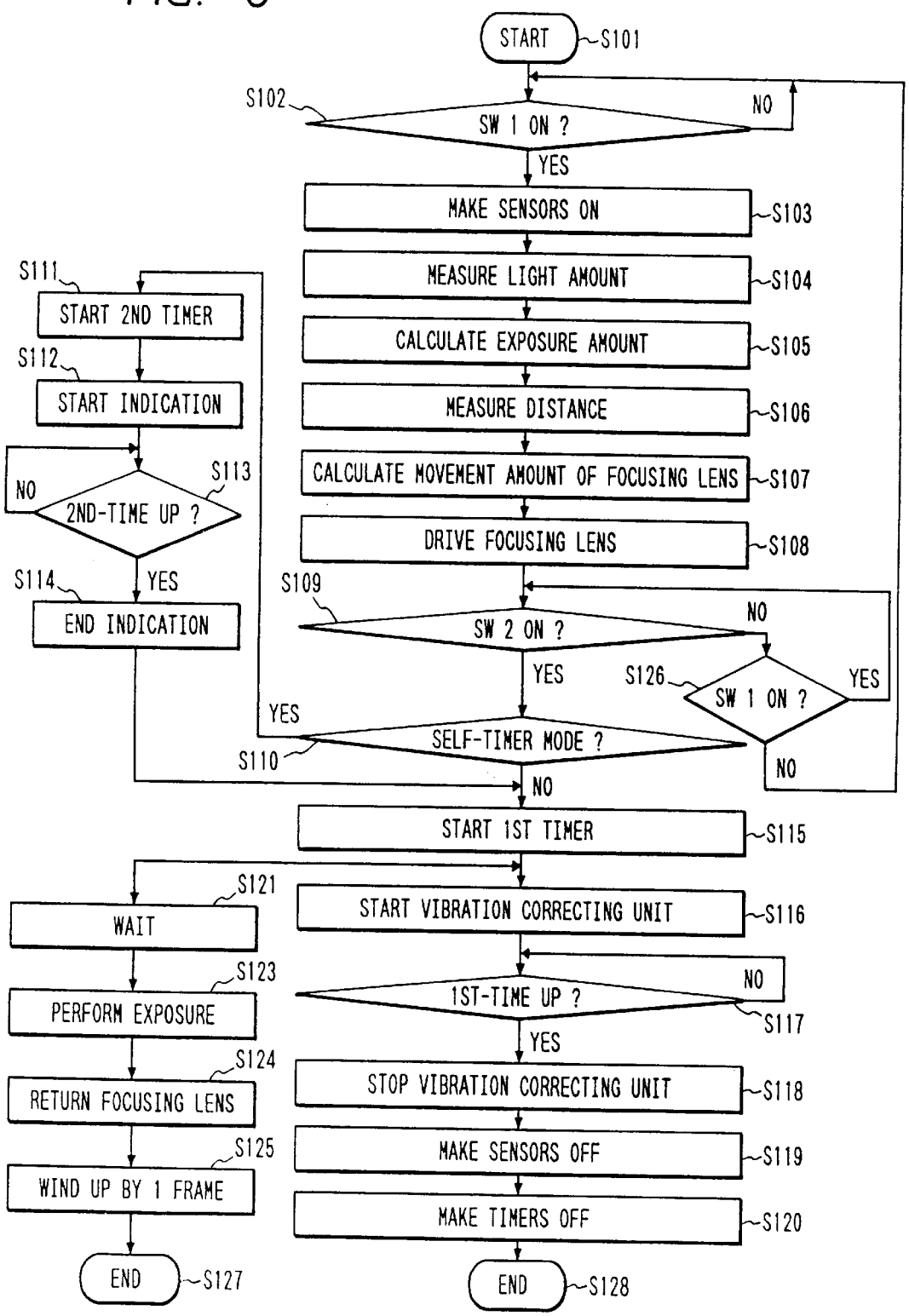
FIG. 8 is a flowchart showing an example process routine performed by a CPU 2' in FIG. 7.
Figure 9:
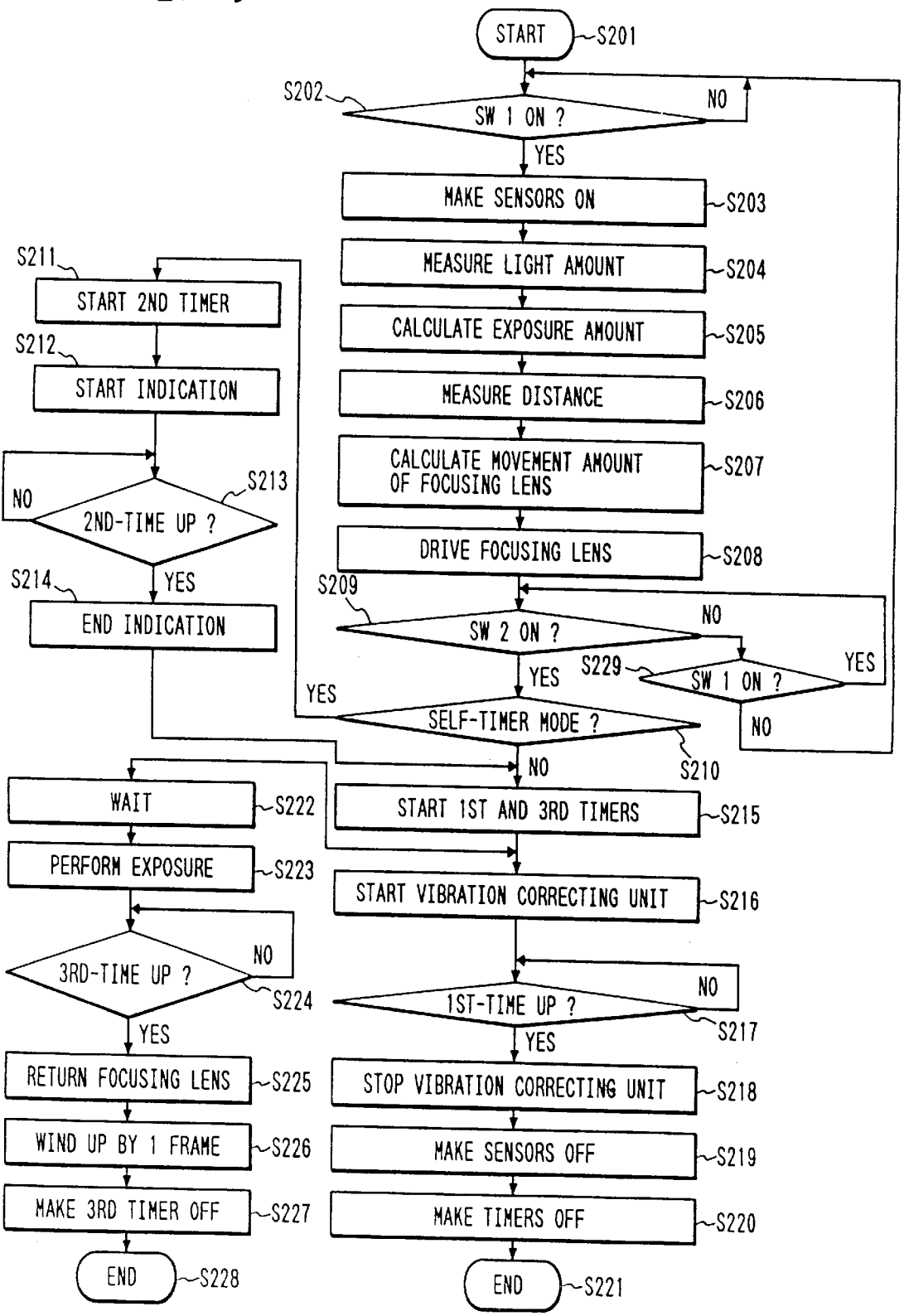
FIG. 9 is a flowchart showing another example process routine performed by the CPU 2' in FIG. 7.
Figure 10:
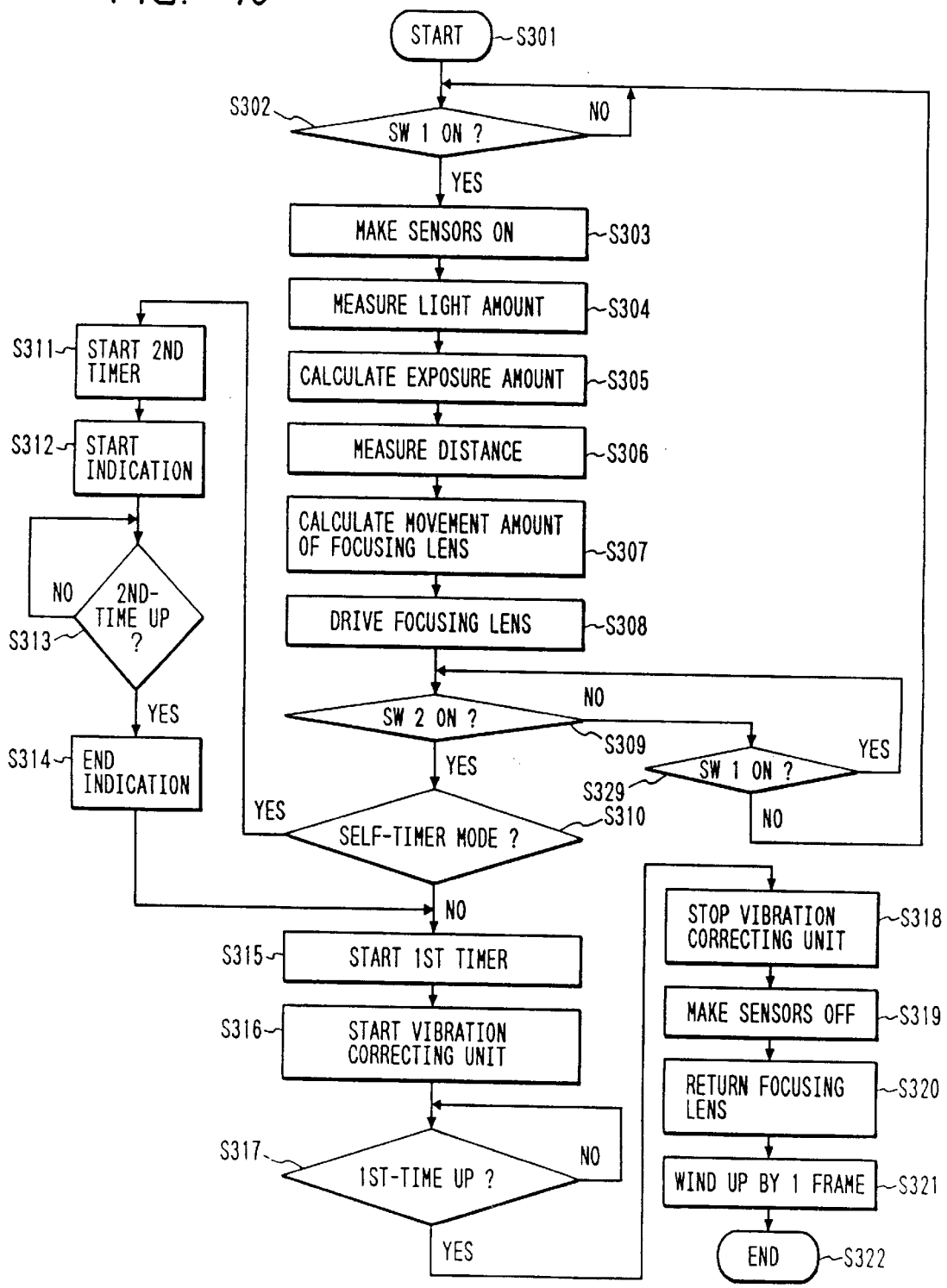
FIG. 10 is a flowchart showing an additional example process routine performed by the CPU 2' in FIG. 7.

The processing of this embodiment will now be described. FIGS. 8 through 10 are flowcharts showing an example process routine performed by the CPU 2'. The sequence of operations with the arrangement in FIG. 7 will be explained below while referring to these flowcharts. This processing is begun when the main power for the camera is turned on.

In FIG. 8, a check is performed at step S102 to determine whether the half-stroke switch SW1 is on or off. If the half-stroke switch SW1 is in the ON state, the sensor of the vibration amount detecting unit 1' is activated at step S103. The light value at a subject is measured for an exposure calculation at step S104. Information about the distance to a subject is obtained at step S106 for focusing the lens. The shift distance for the lens is calculated at step S107, and the lens is driven to focus it at step S108.

Then, at step S109, a check is performed to determine whether the full-stroke switch SW2 is on or not. If the full-stroke switch SW2 is in the ON state, at step S110, a check is performed to determine whether the self-timer mode is set. If the self-timer mode is not set, at step S115, a timer (the first timer) for halting the vibration correcting unit 4' is started. A check is performed at step S117 to determine whether a period of time has expired. When a period of time (timed by the first timer) that is longer than the maximum exposure time has elapsed, the vibration correction is stopped. The sensor is deactivated at step S119. The vibration correction sequence is thereafter terminated at step S128.

In the photographing sequence, at step S121 program control waits for a predetermined period of time until the initiation of the vibration correction is ensured. The exposure (shutter opening and closing) is begun at step S123. After the exposure, a focusing lens is returned to its original position at step S124 (focusing return). Then, at step S125, one frame of a film is wound up.

In this routine, the processing at step S115 and the following steps branch to form two different sequences (processing at steps S115 through S128 and processing at steps S121 through S127), and the two process sequences are performed in parallel. The branching of the processing in another example, which will be described later (FIG. 9) is the same as in this example. In FIG. 8, the exposure at step S123 is at least completed before the vibration correction is halted at step S118. It is desirable that the focusing return at step S124 be performed after the timer is switched off at step S120.

If, at step S110, the self-timer mode is set, a timer (second timer) is started at step S111. A message indicating the self-timer is active is displayed (lighted) at step S112. When (or after), at step S113, a period of time (timed by the second timer) that has a different length from a period for halting the vibration correction has elapsed, program control moves to step S115. The vibration correction can be halted after (or at) the elapse of a predetermined time (timed by the first timer) since the vibration correction is initiated (when the full-stroke switch SW2 is turned on in this example). Thus, it is not necessary to employ a shutter opening/closing signal and the vibration correction sequence can be terminated or halted.

The flowchart in FIG. 9 shows another example process routine performed by the CPU 2'. The processing at steps S201 through S214 in FIG. 9 is the same as that at steps S101 through S114 in FIG. 8. At step S215, a first timer for the vibration correction sequence (vibration correction stop) and a third timer for the photographing sequence (focusing returning and one-frame winding up) are started. The vibration correction process is initiated at step S216. When, at step S217, the time period regulated by the first timer is longer than the maximum exposure time, the vibration correction is halted at step S218. A sensor is turned off at step S219, and the timers are turned off at step S220 (timing counts are halted). The processing sequence is thereafter terminated.

Before the photographing sequence (exposure, focusing return, and the winding up of one frame in this example) is begun, at step S222, program control waits for a predetermined period of time until the initiation of the vibration correction at step S216 is ensured. The exposure (shutter opening/closing) is begun at step S223. When, at step S224, the timing by the third timer (the timer that is employed for the photographing sequence) has continued for a period that is longer than the maximum exposure time, the focusing lens is returned to its original position at step S225 (focusing return). One film frame is wound up at step S226, and the third timer is turned off at step S227 (time counting is halted). The photographing sequence is thereafter terminated at step S228. As described above, a period that continues until the returning of the focusing lens and the feeding of one film frame are performed (i.e., a waiting period timed by the third timer) is set so that it is longer than a period (timed by the first timer) that continues until the halting of the vibration correction is performed. Therefore, the focusing returning and the film feeding (the winding up of one frame) are performed after the vibration correcting process is terminated. In other words, the vibration correction is not performed at the same time (in parallel with) the focusing return and the film feeding are performed, and thus no high-current control is required.

The flowchart in FIG. 10 shows an additional example process routine performed by the CPU 2'. Only the procedures that differ from those in FIG. 9 will be explained. In this process routine, when a set period (which is timed by the first timer) that is longer than the maximum exposure time has elapsed (step S317), the vibration correction is halted (step S318). The sensor is turned off (step S319), and the focusing return (step S320) and the winding up of one frame (step S321) are performed. The feature of this process routine is that the halting of the vibration correction, the focusing return, and the film winding are performed in a time-sharing manner under the control of a single timer.

At step S317, a check is performed to determine whether the set period, which is longer than the maximum exposure time, has elapsed. The exposing, i.e., a shutter release, is initiated and completed before the set period of time has elapsed. Since, in this process routine, the halting of the vibration correction, the focusing return, and the film winding are performed in a time-sharing manner under the control of a single timer, a simple structure can be provided.

Figure 11:
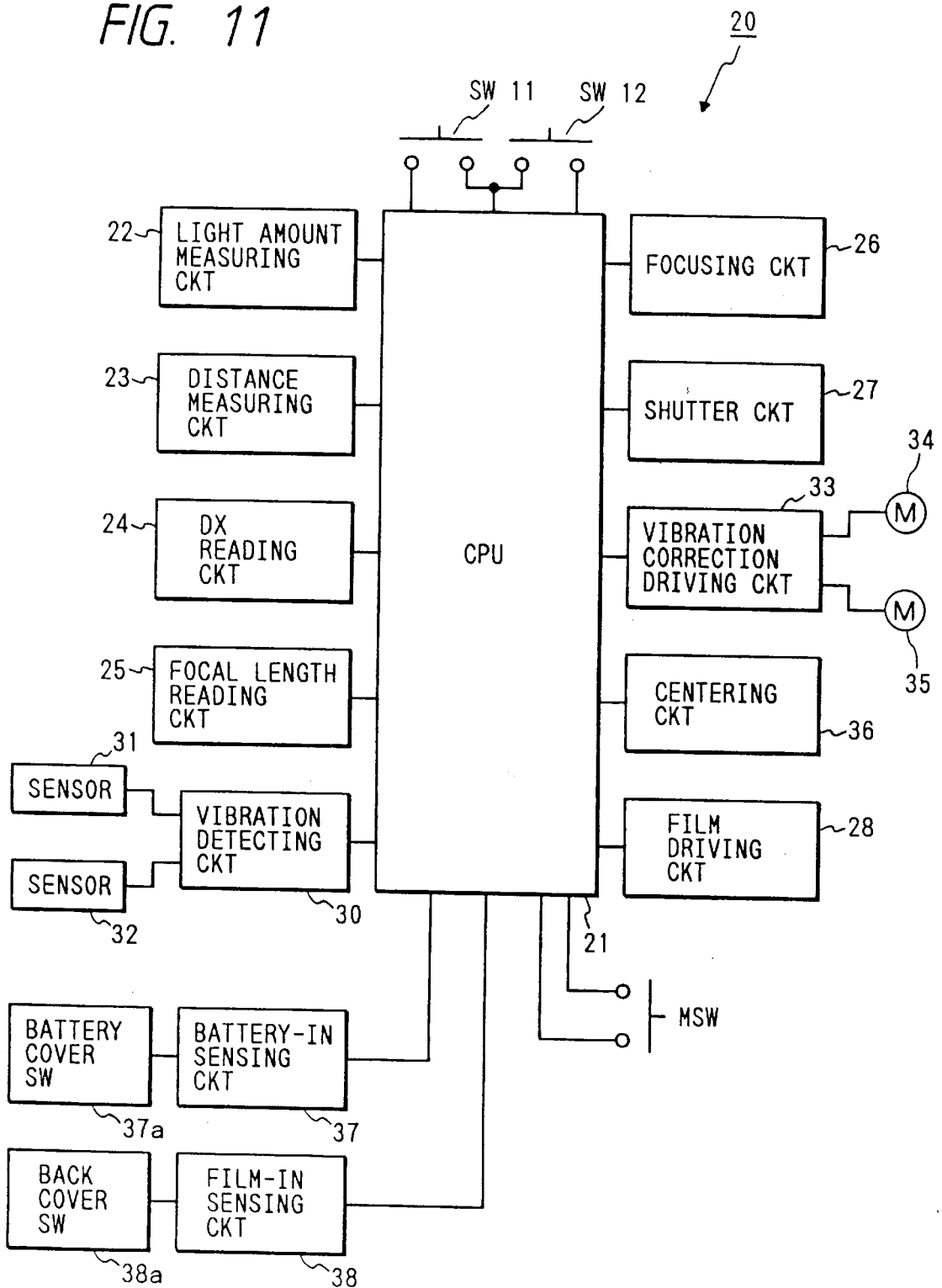
FIG. 11 is a block diagram illustrating a control mechanism, for a vibration preventing camera, that employs one embodiment of a vibration correcting unit according to the present invention.
Figure 15:
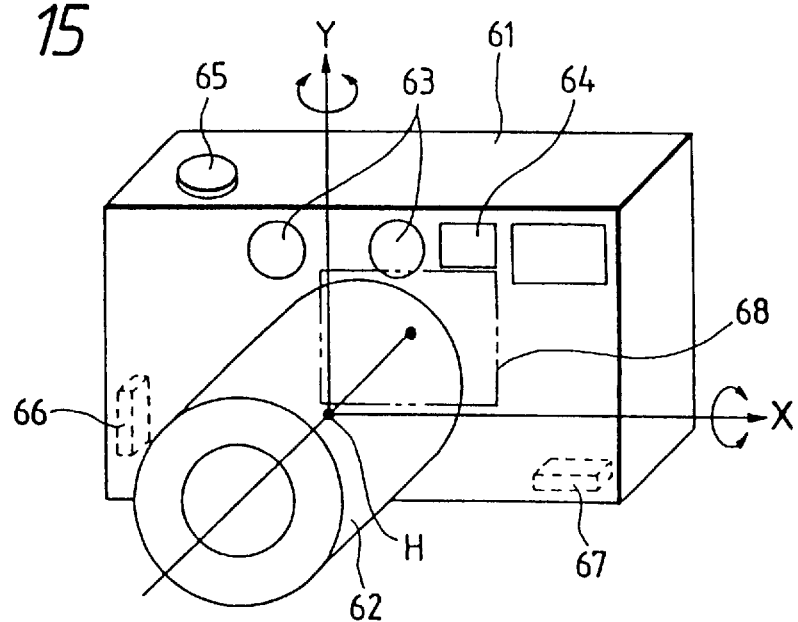
FIG. 15 is a schematic perspective diagram showing an example camera where a conventional vibration correcting unit is provided.
Figure 16A:
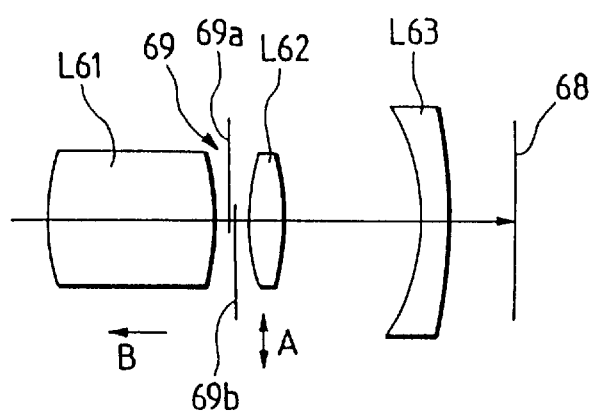
FIGS. 16A and 16B are diagrams illustrating a camera lens optical system shown in FIG. 15 in the wide-angle state and in the telephoto focal state, respectively.
Figure 16B:
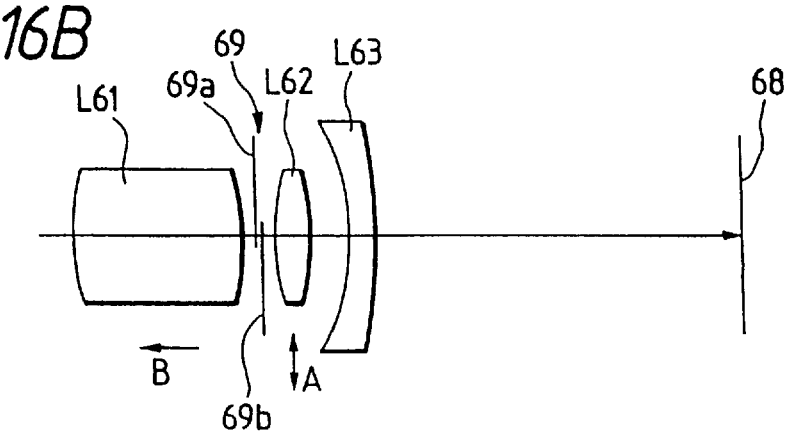

FIG. 11 is a block diagram illustrating a controller of a camera that employs one embodiment of a vibration correcting unit according to the present invention. The vibration correcting unit according to the present invention is mounted in the same compact camera as is shown in FIG. 15.

Included in a controller 20 of a camera in which the vibration correcting unit is mounted is a CPU 21.

The CPU 21 is connected to a light amount measuring circuit 22 that measures the light value at a subject, a distance measuring circuit 23 that measures the distance to a subject, a DX reading circuit 24 that reads a DX contact point on a film cartridge to detect a film ISO sensitivity, and a focal length reading circuit 25 that reads a focal length.

A focusing circuit 26 focuses a lens optical system in consonance with the distance measured by the distance measuring circuit 23. A shutter circuit 27 controls an exposure time. A film driving circuit 28 winds up and rewinds a film. These circuits are also connected to the CPU 21.

Further, SW11 denotes a half-stroke switch that is turned on by the half-stroke depression of the release button of the camera. SW12 denotes a full-stroke switch that is turned on by the full-stroke depression of the release button of the camera. MSW denotes the main switch of the camera. These switches are well known.

A vibration amount detecting circuit 30, which serves as vibration amount detecting unit, detects and sends to the CPU 21 the amount of vibration of an image on a film plane as detection signals from vibration detecting sensors 31 and 32, which include angular velocity sensors that are provided in the camera to detect an angular velocity along the X-axis and along the Y-axis.

A vibration correction driving circuit 33, which is a vibration correcting unit, drives the vibration correcting lens L62, in consonance with the detection result obtained by the vibration amount detecting circuit 30, and prevents image vibration. The vibration correction driving circuit 33 is designed to drive motors 34 and 35 of a vibration correcting lens drive mechanism in FIGS. 13 and 14, which will be described later. The motors 34 and 35 drive the vibration correcting lens driving mechanism so that it shifts the vibration correcting lens L62.

More specifically, upon receipt of the signals from the sensors 31 and 32, the vibration amount detecting circuit 30 determines that the camera has been turned. The CPU 21 then performs a vibration correction process, drives the motors 34 and 35, based on the processing result, via the vibration correction driving circuit 33 and shifts the vibration correcting lens L62 to correct the image vibration.

A centering circuit 36 returns the vibration correcting lens L62, which is shifted by the vibration correcting lens drive mechanism, to its centering position.

A battery-in sensing circuit 37 detects the presence of a battery that is loaded inside the camera. A battery cover switch 37a for detecting the opening and closing of a battery cover is connected to the battery-in sensing circuit 37. The battery-in sensing circuit 37 detects, via the battery cover switch 37a, the opening and closing of the battery cover, determines that a battery is loaded in, and forwards a detection signal to the CPU 21.

A film-in sensing circuit 38 detects whether or not a film (film cartridge) is loaded in the camera. A back cover switch 38a for detecting the opening and closing of a camera back cover is connected to the film-in sensing circuit 38. The film-in sensing circuit 38 detects, via the back cover switch 38a, the opening and closing of the back cover, determines that a film is loaded, and forwards a detection signal to the CPU 21.

With the above described arrangement of the vibration correcting unit according to the present invention, when it is inferred that photographing may be expected immediately, such as when there is a detection signal from either the battery-in sensing circuit 37 or the film-in sensing circuit 38, i.e., when the loading of a battery is detected, or when film is loaded and the back cover is closed, the vibration correcting unit is activated in advance. The exposure process does not overlap the buildup time for the vibration detection and correction when their performances are not satisfactory, which is a conventional shortcoming, so that the stable effect available with vibration correction can be acquired at the time of photographing.

The process routine performed by the CPU 21 of the vibration correcting unit according to the present invention will now be described while referring to the flowcharts in FIGS. 12A, 12B and 12C.

Figures 12, 12A:
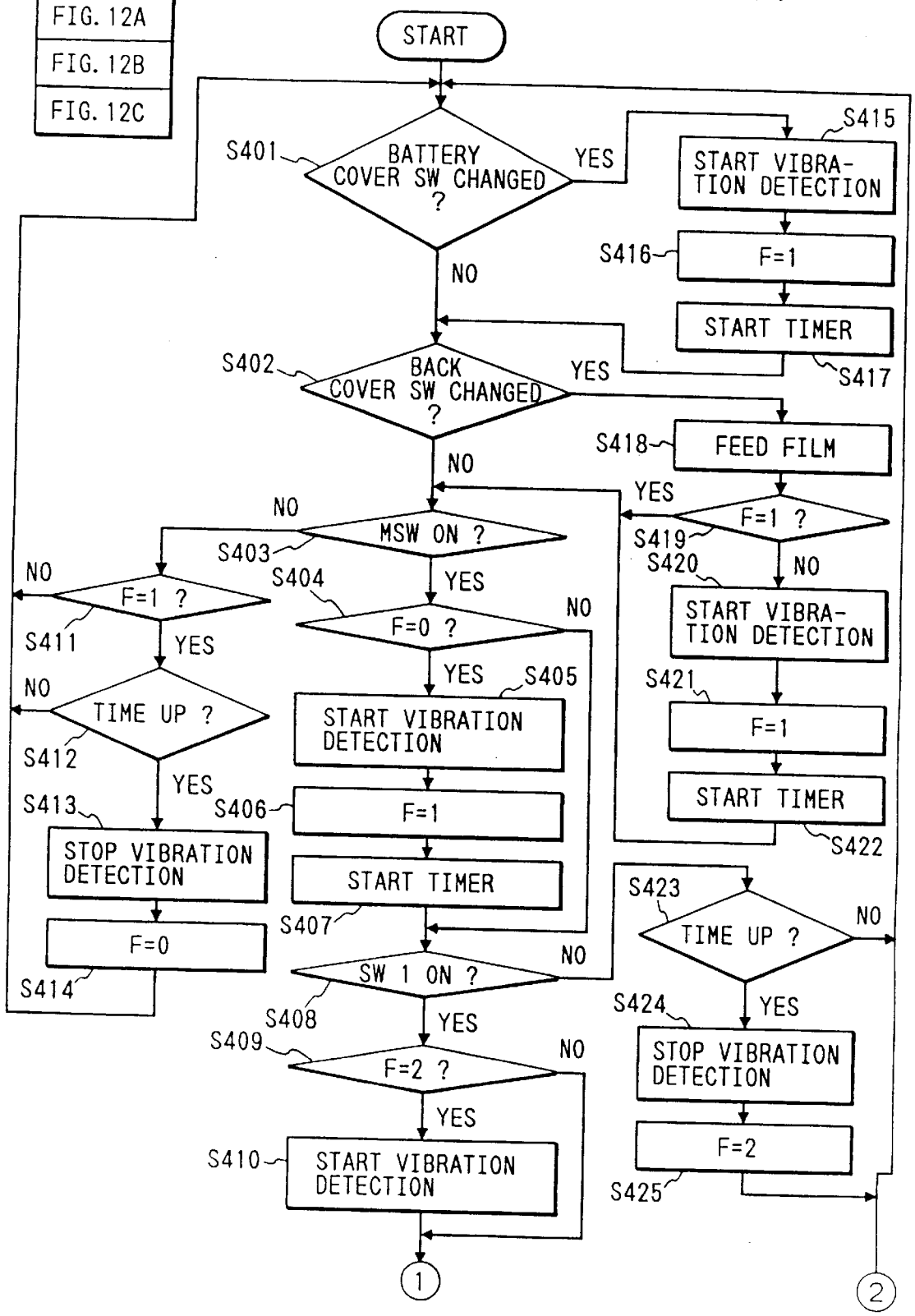
FIG. 12 is comprised of FIGS. 12A, 12B and 12C showing flowcharts showing an example process routine performed by a CPU 21 in FIG. 11.

When, at step S401 in FIG. 12A, the battery-in sensing circuit 37 detects a change at the battery cover switch 37a and the CPU 21 acknowledges the replacement of the battery, program control moves to step S415, where the vibration amount detecting circuit 30 and the sensors 31 and 32 are activated to perform vibration amount detection. When, at step S415, the vibration detection is initiated, a flag value, F=1, is set at step S416 and a timer is started at step S417.

Then, program control moves to step S402, as in the case where the CPU 21 does not acknowledge the replacement of a battery at step S401. At step S402, the film-in sensing circuit 38 detects a change at the back cover switch 38a and the CPU 21 acknowledges that film has been loaded.

When the film is loaded, at step S418 the film is fed. The setting of the flag is then confirmed at step S419. If the flag value setting is F=1 (i.e., the vibration detection has begun), program control goes to step S403. If no flag value is set to F=1, the vibration detection is begun at step S420. At step S421, the flag value is set to F=1, and a timer is started at step S422.

Program control then moves to step S403 as in the case where the CPU 21 does not acknowledge that film is loaded at step S402. When the main switch MSW is turned on, the flag is examined at step S404. If no flag value is set, F=0, program control advances to step S405 where vibration detection is started. A flag value is set, F=1, at step S406, and the timer is started at step S407.

When half-stroke switch SW11 of the release button is turned on, program control advances from step S408 to step S409, where a check is performed to determine whether a flag value, F=2, is set.

If the flag value is set, F=2, program control advances to step S410 where the vibration detection is initiated.

If, at step S408, the half-stroke switch SW11 is not on, at step S423, a check is performed to determine whether or not the period of time that is begun when the timer was started has exceeded a predetermined time (e.g., two minutes). When the time has expired, the vibration detection is halted at step S424. After this, the flag value is rewritten as F=2, at step S425. Program control thereafter returns to the start step.

If, at step S423, the period of time that has elapsed since the timer is started has not reached the set time, program control returns to the start step.

When, at step S403, the main switch MSW is not on, the flag is examined at step S411. When the flag value is not set to F=1, program control returns to the start step. When the flag value is set to F=1, a check is performed at step S412 to determine the period of time since the timer was started. If that period is within the set time, program control returns to the start step. If the set time has expired, the vibration detection is halted at step S413. The flag value is set to F=0 at step S414, and program control thereafter returns to the start step.

Figure 12B:
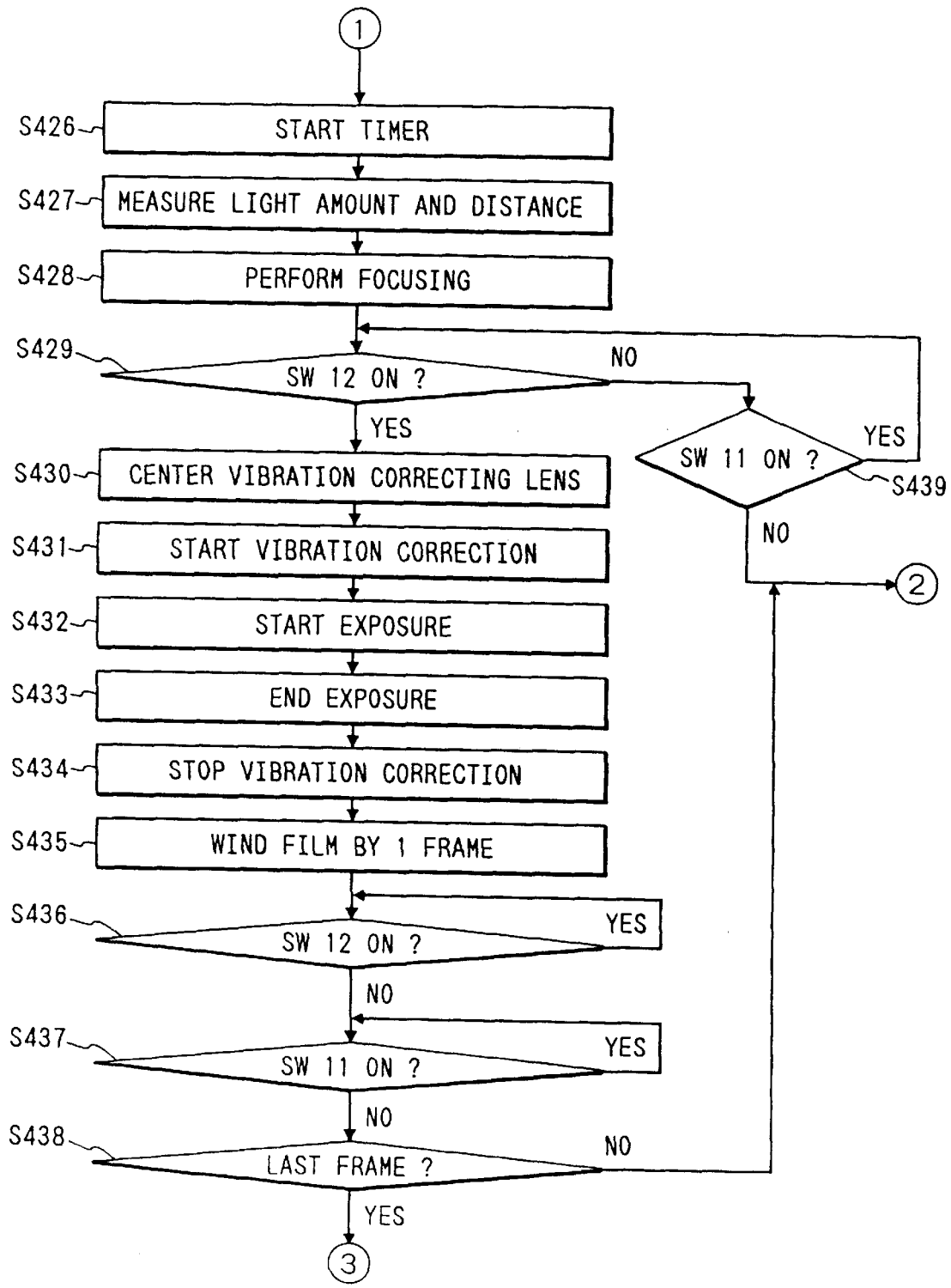

In FIG. 12B, the timer is started at step S426, the light amount and a distance are measured by the light amount measuring circuit 22 and the distance measuring circuit 23 at step S427, respectively. The focusing is performed at step S428 by the focusing circuit 26.

When the full-stroke switch SW12 is turned on, program control advances to step S430. When the full-stroke switch SW12 is not on, program control moves to step S439, where a check is performed to determine whether or not the half-stroke switch SW11 is still in the ON state. If the switch SW11 is in the ON state, program control returns to step S429. If the switch SW11 is not in the ON state, program control returns to the start step in FIG. 12A.

At step S430, the shifted vibration correcting lens L62 is returned to the center position, the CPU 21 calculates the amount of shift for the vibration correcting lens L62. Then, the lens driving motors 34 and 35 are rotated by the vibration correction driving circuit 33 to initiate the vibration correction at step S431.

Sequentially, the shutter circuit 27 initiates the exposure at step S431 and terminates it at step S432.

The vibration correction is performed from the initiation of the vibration correction at step S431 until the completion of the exposure at step S433. After the exposing is completed, the vibration correction is stopped at step S434. Then, at step S435 the film is wound up by the film driving circuit 28.

If, at step S436, the full-stroke switch SW12 is not on, program control advances to step S437. When, at step S437, the half-stroke switch SW11 is not in the ON state, a check is performed at step S438 to determine whether or not the film frame is the last frame. If the film frame is not the last one, program control returns to the start step.

When the film frame is the last one, program control advances to step S440.

A flag value, F=0, is set at step S440, and film rewinding is begun at step S441. Then, at step S442, a check is performed to determine whether or not the film rewinding has been completed. If the film rewinding has been completed, the film rewinding is stopped at step S443.

At step S444, a check is performed to determine whether or not the back cover has been opened. If the back has been opened, this process routine is terminated.

Although, in this embodiment, the back cover switch 38a is employed as a film-in sensing switch, for detecting the presence of film, to determine that the opening and the closing of the camera back cover is for loading a film, the present invention is not limited by this. The presence of a film may be acknowledged by directly detecting film that is loaded and is inside a camera.

Further, in addition to the employment of the battery cover switch 37a in this embodiment, the presence of a battery in the camera may be detected from a change in the voltage in the circuitry of the camera.

Figure 13:
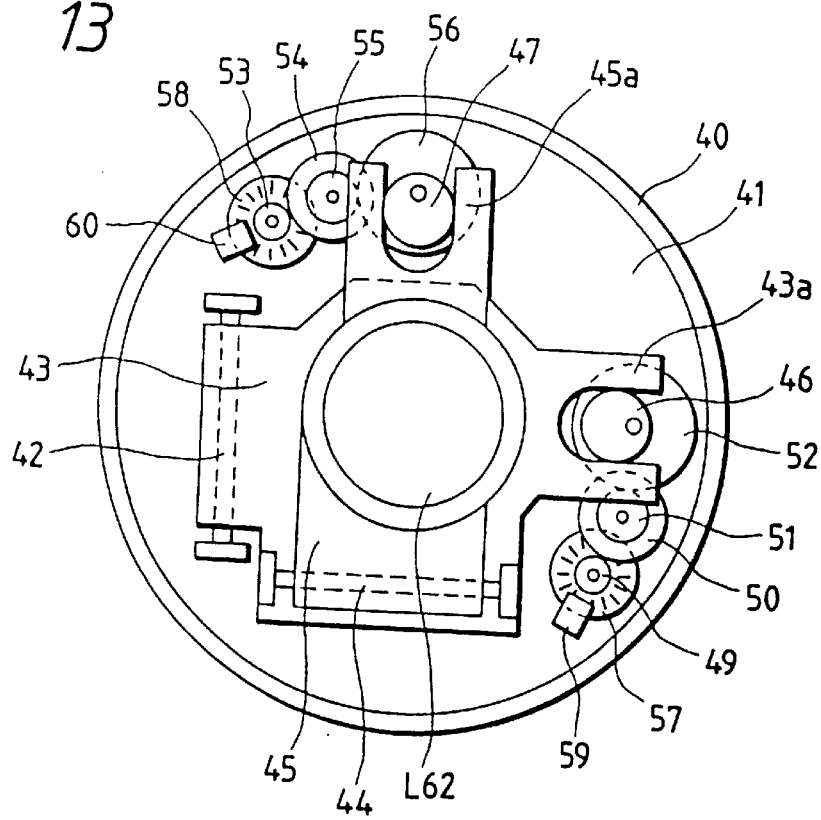
FIG. 13 is a schematic diagram illustrating an example of a vibration correcting lens drive mechanism in the vibration correcting unit according to the present invention.
Figure 14:
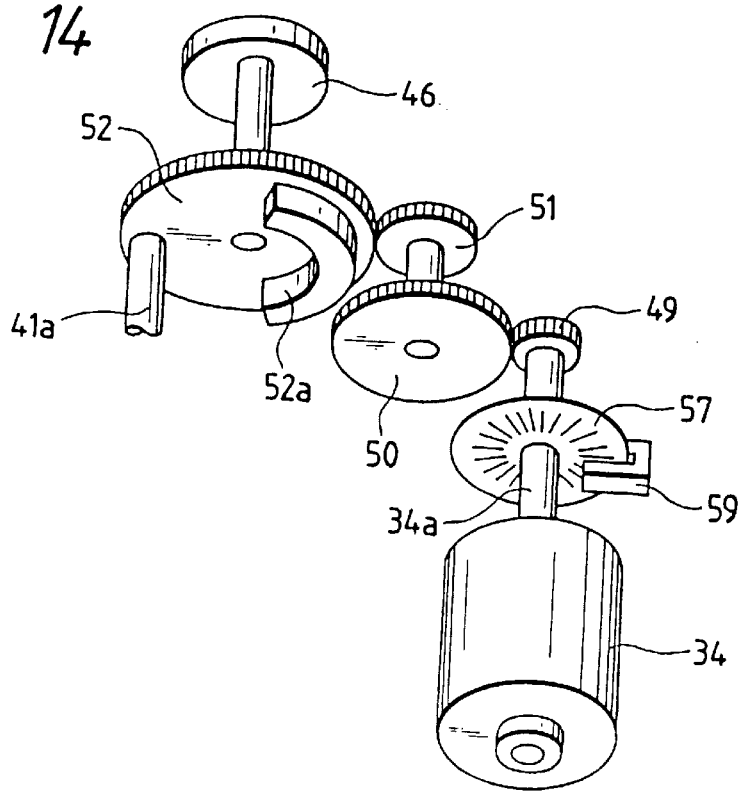
FIG. 14 is a schematic perspective view for an example of a centering mechanism for a vibration correcting lens in the drive mechanism shown in FIG. 13.

FIGS. 13 and 14 are diagrams illustrating a drive mechanism, for the vibration correcting lens L62, whose use is desirable in the vibration correcting unit according to the present invention.

To describe it briefly, in FIG. 13, within a lens barrel 40 is provided a base plate 41 on which is assembled the drive mechanism for the vibration correcting lens L62. A guide rod 42 is fixed to the base plate 41, and a lens drive plate 43 so engages the guide rod 42 that it can be shifted in the axial direction.

Another guide rod 44 is fixed to the lens drive plate 43, and a lens retaining plate 45 so engages the guide rod 44 that it can be moved in its axial direction.

Since the vibration correcting lens L62 is attached to the lens retaining plate 45, the vibration correcting lens L62 can be shifted by the lens drive plate 43 and the lens retaining plate 45 in the vertical direction (along Y-axis) and in the horizontal direction (along X-axis) along the plane that is perpendicular to the light axis in the lens barrel 40.

Arms 43a and 45a are provided for the lens drive plate 43 and the lens retaining plate 45, respectively, and cams 46 and 47 abut upon the interior surfaces of the respective U-shaped portions of the arms 43a and 45a.

The driving force exerted by the motor 34 is transferred via gears 49, 50, 51, and 52 to the cam 46, while the driving force exerted by the motor 35 is transferred via gears 53, 54, 55, and 56 to the cam 47.

Encoder plates 57 and 58 are fitted around the shafts of the respective motors 34 and 35. Photo interrupters 59 and 60, which detect the revolutions and the rotating speeds of the encoder plates 57 and 58, are located near the encoder plates 57 and 58.

The operation of the drive mechanism for the vibration correcting lens L62 will now be explained. As is described in FIGS. 12A to 12C, the motors 34 and 35 are driven in consonance with the amount of vibration that is detected, and the driving forces are transferred via the gears 49 through 52 and via the gears 53 through 56 to the respective cams 46 and 47.

As the cam 46 rotates, the vibration correcting lens L62 is shifted in the direction that is perpendicular to the plane that bisects the light axis. As the cam 47 rotates, the vibration correcting lens L62 is shifted in the horizontal direction relative to the plane that bisects the light axis. As a result, it is possible to perform vibration correction.

The amount of shift for the vibration correcting lens L62 is detected by the photo interrupters 59 and 60, and fed back to the CPU 21 in FIG. 11.

FIG. 14 is a diagram showing the centering method for the vibration correcting lens L62, which is performed by the drive mechanism of the vibration correcting lens L62. Since the systems for both of the motors 34 and 35 are identical, only the assembly for the motor 34 will be explained.

A rotating angle for the cam 46 is defined within a predetermined range by a protrusion 52a, which is located under the gear 52, which is fitted to the shaft of the cam 46, and a pin 41a on the base plate 41. When one end of the protrusion 52a, in its circumferential direction, abuts upon the pin 41a, the limit is reached for the shifting of the vibration correcting lens L62.

In other words, the distance the vibration correcting lens L62 can be shifted is limited, and the mid point of the shift distance is defined as the center position for the vibration correcting lens L62. The state in FIG. 14 shows when the vibration correcting lens L62 is located in the center.

After the vibration correction is halted, when the motor 34 rotates until one end of the protrusion 52a abuts upon the pin 41a, of the base plate 41, and then the motor 34 inversely rotates to the mid point of the shift distance, the vibration correcting lens L62 is returned to the center position (step S430 in FIG. 12B).

In the vibration correcting unit with the above described arrangement, the manipulations from which it is inferred that photographing may be expected immediately, such as the loading of a battery and of film, are detected by the individual sensing circuits 37 and 38 by using information that is acquired via the battery cover switch 37a, for detecting the presence of a battery, and the back cover switch 38a, for detecting the presence of film. In consonance with these detection results, the vibration correcting unit is activated before photographing and detects and corrects vibrations. Therefore, especially in the buildup time for vibration detection and correction when their performances are not satisfactory, a sufficient period of time is ensured before the angular velocity sensors 31 and 32, and the vibration amount detecting circuit 30 and the vibration correcting circuit 33 become stable, and the overlapping of the vibration amount detection and the vibration correction with the exposure operation can be avoided.

According to the present invention, the initiation of vibration detection and of vibration correction is performed while referring to the photography sequence, and vibration detection is thus begun after the loading of a battery or film is detected. Therefore, as a sufficient period of time is ensured to permit the sensors 31 and 32, the vibration amount detecting circuit 30, and the vibration correcting circuit 33 to become stable, and as constant vibration correction is effected, a vibration correcting unit for a camera is provided that has an improved snapshot performance and ensures a stable image.

According to the present invention, the vibration amount detection and the vibration correction are begun (1) when the replacement of a battery is acknowledged, (2) when the loading of film is acknowledged, (3) when the feeding of film is acknowledged, (4) when the ON state of the main switch MSW is acknowledged, and (5) when the ON state of the half-stroke switch SW11 of the release button is acknowledged. Further, even if the vibration amount detection or the vibration correction is initiated by any of the conditions (1) through (5), and the half-stroke switch SW11 of the release button is not in the ON state after a predetermined period has elapsed immediately following the initiation, the vibration amount detection is stopped. The effect derived from this operation can be provided.

The present invention is not limited to the arrangements in the above described embodiments, and the shapes and the structures of the individual components may be appropriately modified or altered.

Although, in the above described embodiments, the vibration correcting circuit of the present invention is employed in a compact camera, as is shown in FIG. 15, and the drive mechanism for the vibration correcting lens L62 is arranged as is shown in FIGS. 13 and 14, the present invention is not thereby limited. The vibration correcting circuit of the present invention can be effectively employed in a single-lens reflex camera, and the drive mechanism for the vibration correcting lens L62 may be modified in various ways.

FIGS. 17A through 20 are diagrams illustrating an additional embodiment of a vibration preventing camera according to the present invention. The schematic arrangement of the vibration preventing camera will now be described while referring to FIGS. 17A to 18.

In FIG. 17A, a fixed lens barrel 84 is an integral part of a camera body, and straight grooves 84a and 84b are formed in the external surface of the lens barrel 84 in the direction of the light axis. A cam barrel 83 is so fitted around the external surface of the lens barrel 84 that is rotatable, and is kept from sliding off by a ring 85.

The rotation of a zoom motor M1 is transferred via gears 92 and 93 to a gear 85a that is formed around the external surface of the cam barrel 83, and the cam barrel 83 is then rotated. Cam grooves 83a, 83b, and 83c are formed in the external surface of the cam barrel 83. A slit disk 121A rotates together with the zoom motor M1, and a photo interrupter 121B monitors the revolutions of the slit disk 121A, i.e., the revolutions of the zoom motor M1.

Figure 18:
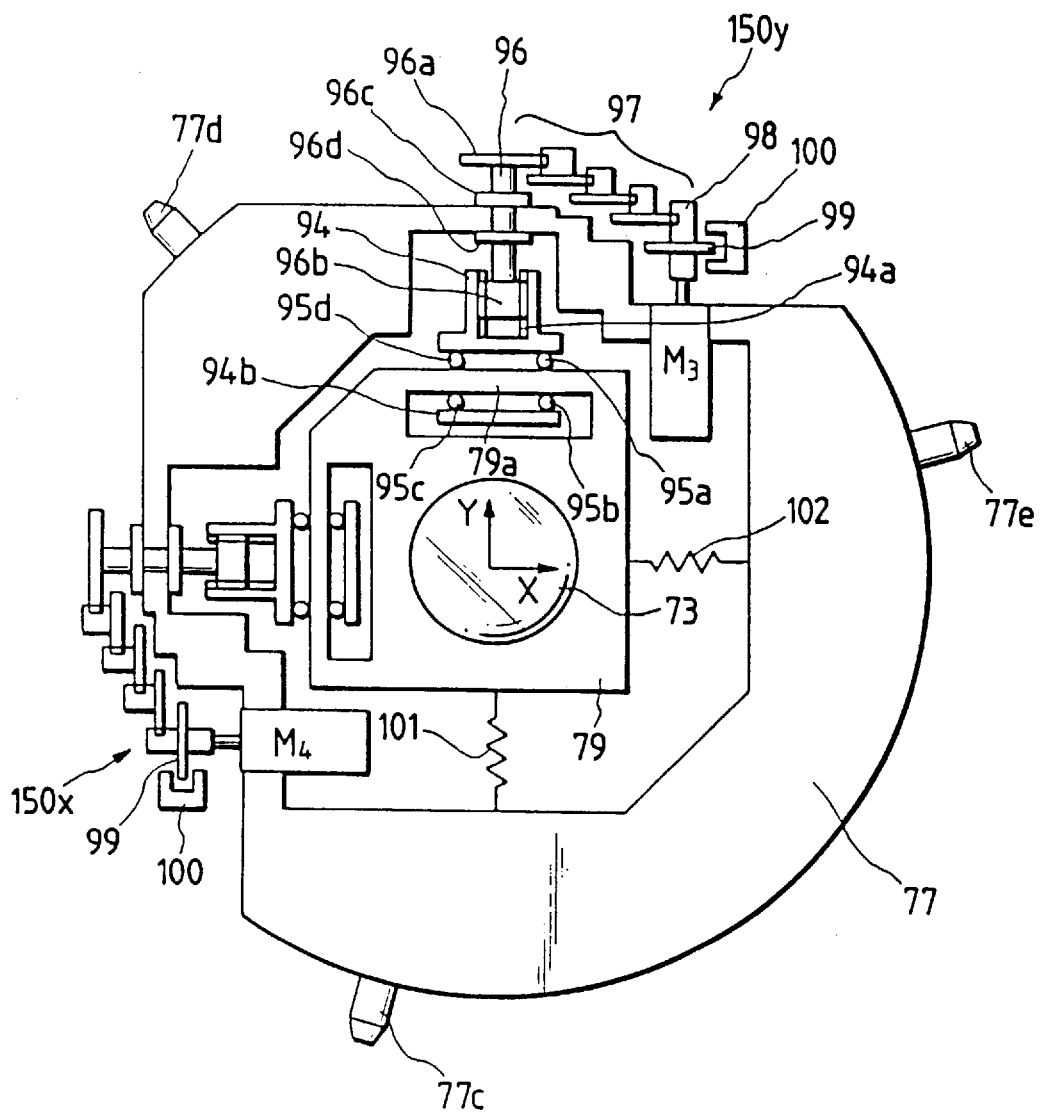
FIG. 18 is a cross sectional view taken along the line 18—18 in FIG. 17A.

A lens base plate 77 is inserted into the distal end of the lens barrel 84, and a vibration correcting unit is retained in the plate 77. The vibration correcting unit comprises a vibration correcting lens 73 (hereafter referred to simply as a correcting lens), which is held in a lens holder 79, and a drive mechanism (vibration correction drive mechanism), which drives the correcting lens 73. The drive mechanism includes an X-direction drive mechanism 15OX that drives the correcting lens 73 in the X-direction and a Y-direction drive mechanism 150y that drives the correcting lens 73 in the Y-direction, as is shown in FIG. 18. The X- and Y-directions are perpendicular to the light axis of the lens.

The Y-direction drive mechanism 150y includes a Y-direction motor M3, a gear 98 that rotates with the output shaft of the motor M3, a deceleration gear series 97 that reduces the rotational speed of the motor M3, a Y-directional shifting drive shaft 96 that is coupled with the gear series 97, and a Y-direction drive arm 94 that converts the rotation of the drive shaft 96 into linear travel.

The Y-directional shifting drive shaft 96 is supported rotatably at the base plate 77 by paired flanges 96c and 96d, a gear 96a that engages the last gear in the deceleration gear series 97 is mounted on the top end of the drive shaft 96, and an external thread 96b is formed at the lower portion of the drive shaft 96. The Y-direction drive arm 94 is non-rotatable and is so held that it can ascend or descend within a space that is defined by the base plate 77. The external thread 96b of the drive shaft 96 is screwed into an internal thread 94a that is formed within the upper portion of the drive arm 94.

A holding portion 94b is formed at the bottom of the drive arm 94. An upper coupling portion 79a of the lens holder 79 is held by the holding portion 94a via four slider balls 95a through 95b. As the drive arm 94 ascends or descends, the lens holder 79, i.e., the correcting lens 73 is shifted in the Y-direction. The distance it is shifted depends on the number of revolutions of the motor M3.

Since the X-direction drive mechanism 150x has the same arrangement as does the Y-direction drive mechanism 150y, the correcting lens 73 is shifted in the X-direction that is indicated by the arrow in FIG. 18.

The correcting lens 73 that is to be shifted by the Y-direction drive mechanism 150y is free in the X-direction. The correcting lens 73 that is to be shifted by the Y-direction drive mechanism 150x is free in the Y-direction. The correcting lens 73 can be shifted by the two drive mechanisms 150x and 150y in any direction that is perpendicular to the light axis.

A disk 99, in which a plurality of holes is concentrically formed, is so attached that it rotates with the gear 98 that rotates with the output shaft of the Y-direction motor M3. A photo interrupter 100 has a light projection portion and a light reception portion that face each other with the portion of the disk 99 in which holes are formed intervening. Each time the photo interrupter 100 detects a hole in the disk 99, a pulse signal is output. Therefore, by counting the number of pulses, the revolutions of the motor M3 (which depends on the shifting amount of the correcting lens 73) can be determined.

The disk 99 and the photo interrupter 100 that are structured as above are also provided for the X-direction motor M4, so that the revolutions of the motor M4 can be determined.

Springs 101 and 102 force a lens 79 frame toward the Y-direction drive mechanism 150y and the X-direction drive mechanism 150x, respectively.

A lens shutter mechanism is integrally attached to the above arranged vibration correcting unit, as is shown in FIG. 17A. In the lens shutter mechanism, a shutter piece 82, which is also used as an aperture and a drive portion 76, which drives the shutter piece 82, are formed together, and the drive portion 76 is secured to the base plate 77 by a machine screw. A lens 72 is retained in the drive portion 76 by the lens holder 78.

A cam follower 77c, which is embedded in the base plate 77, engages the cam groove 83b along the straight groove 84a. A lens holder 75 that holds a lens 71 is inserted at the distal end of the base plate 77. A cam follower 75a, which is embedded in the external surface of the lens holder 75, engages the cam groove 83a along the straight groove 84b.

A lens base plate 80, which has a helicoid 80b formed on its internal surface, is inserted into the lens barrel 84 from the rear. A cam follower 80a that is embedded in the external surface of the lens base plate 80 engages the cam groove 83c along the straight groove 84a. A lens holder 81 holds a focusing lens 74, and a helicoid 81b that is formed on the external surface of the lens holder 81 is screwed into the helicoid 80b of the lens base plate 80.

The gear 88 that rotates with the output shaft of the focusing motor M2 engages a gear 81a that is provided in the lens holder 81. As the motor M2 rotates the lens holder 81 is rotated. A slotted disk 89 rotates with the focusing motor M2, and a photo interrupter 90 detects the revolutions of the slotted disk 89, i.e., the revolutions of the focusing motor M2.

A lens optical system is thus constituted by the above described lenses 71 through 74.

The arrangement of the control system for the vibration preventing camera will now be described while referring to FIGS. 17A and 17B.

The zoom motor M1 and the focusing motor M2 are connected to a CPU 111 via a zoom motor driver 112 and a focusing motor driver 119, respectively.

The Y-direction motor M3 and the X-direction motor M4 (FIG. 18) that constitute the drive mechanism for the vibration correcting unit are connected via a flexible print circuit board (hereafter referred to as an "FPC") 86 to a vibration correction motor driver 114. The driving portion 76 of the lens shutter mechanism is connected via the FPC 86 to a shutter-cum-stop motor driver 113. The motor drivers 113 and 114 are connected to the CPU 111.

The X-direction and the Y-direction outputs of the photo interrupter 100 are transmitted to the CPU 111 via the FPC 86 and a vibration correction motor rotation amount detecting circuit 115. The outputs of the photo interrupters 121A and 90 are sent to the CPU 111 via a zoom motor rotation amount detecting circuit 122 and a focusing motor rotation amount detecting circuit 120, respectively. From the outputs of the detecting circuits 115, 122, and 120, the CPU 111 acknowledges the shifted position of the correcting lens 73, the driven position of the focusing lens 74, and the focused distance for the lens.

To the CPU 111 are also connected a light amount measuring circuit 116, which measures the light value of a subject; a distance measuring circuit 117, which measures the distance to a subject; a vibration detecting sensor 118, such as an angular velocity sensor, which detects the amounts of vibration in the X- and Y-directions; a sensitivity detecting circuit 123, which detects the ISO sensitivity of film; a centering circuit 124, which shifts the correcting lens 73 to the center position that serves as its original position (the position where the light axis of the correcting lens 73 corresponds to the light axis of the lens); a film winding circuit 125; a flash control circuit 126A for an electronic flashing unit (stroboscope) 126; and a driving circuit for a red-eye reduction lamp 128.

The centering circuit 124 controls the X-direction and the Y-direction outputs of the photo interrupter 100 so that they are predetermined reference values, and drives the correcting lens 73 to the center position.

According to the camera in this embodiment, the red-eye reduction lamp 128 is pre-flashed before it is flashed in order to reduce the occurrence of the red-eye phenomenon, and then light is emitted from a flashing portion 126B of the electronic flashing unit 126 for flash photography.

Further, to the CPU 111 are connected a half-stroke switch SW21, which is turned on by the half-stroke depression of a release button (not shown); a full-stroke switch SW22, which is turned on by a full-stroke of a release button; and a zoom-up switch SW23 and a zoom-down switch, SW24 which are employed to adjust the zoom lens.

Figure 17B:
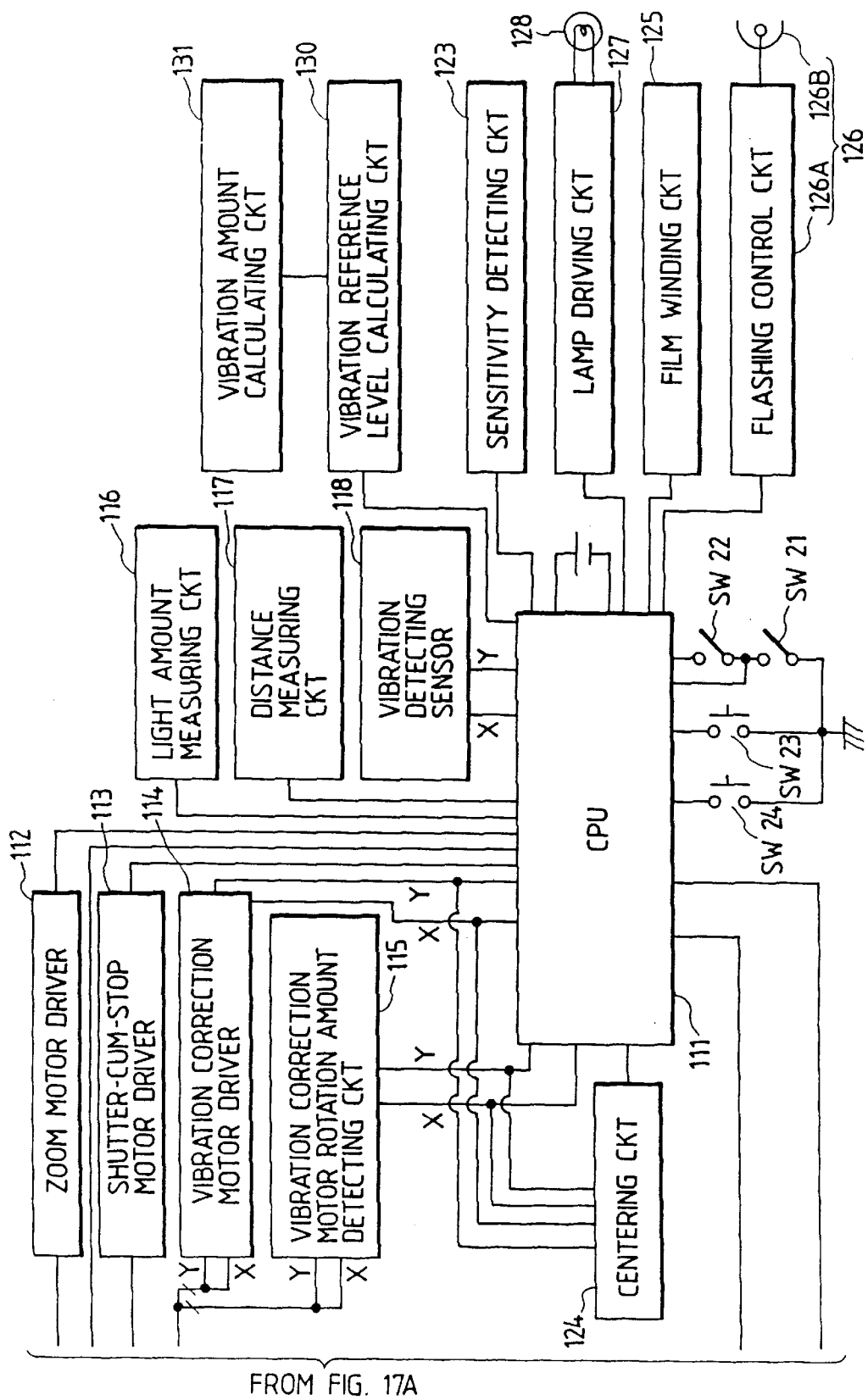
FIG. 17 is comprised of FIGS. 17A and 17B showing schematic block diagrams illustrating the basic arrangement of a vibration preventing camera according to another embodiment of the present invention.

A vibration reference level calculating circuit 130 in FIG. 17B calculates the vibration reference level ($\omega=0$), and a vibration amount calculating circuit 131 employs the reference level to calculate the amount of vibration. With these circuits 130 and 131, a specific value for the vibration detected by the vibration detecting sensors is obtained.

The processing of this embodiment will now be described.

When the zoom-up switch SW23 or the zoom-down switch SW24 is turned on, the CPU 111 outputs a drive signal to the zoom motor M1 via the zoom motor driver 112, and rotates the motor M1 in a given direction. Accordingly, the cam barrel 83 is rotated via the gears 93, 92 and 85a, and the cam grooves 83a, 83b, and 83c are shifted. In consonance with the shifting of the cam grooves 83a through 83c, the cam followers 75a, 77c, and 80a are moved along the straight grooves 84a and 84b in the direction of the light axis. Then, the lens holder 75, which holds the lens 71, the base plate 77, which holds the lenses 72 and 73, and the lens base plate 80, which holds the lens 74, are driven in the direction of the light axis, and the zooming is performed (zooming up or down).

Figure 19B:
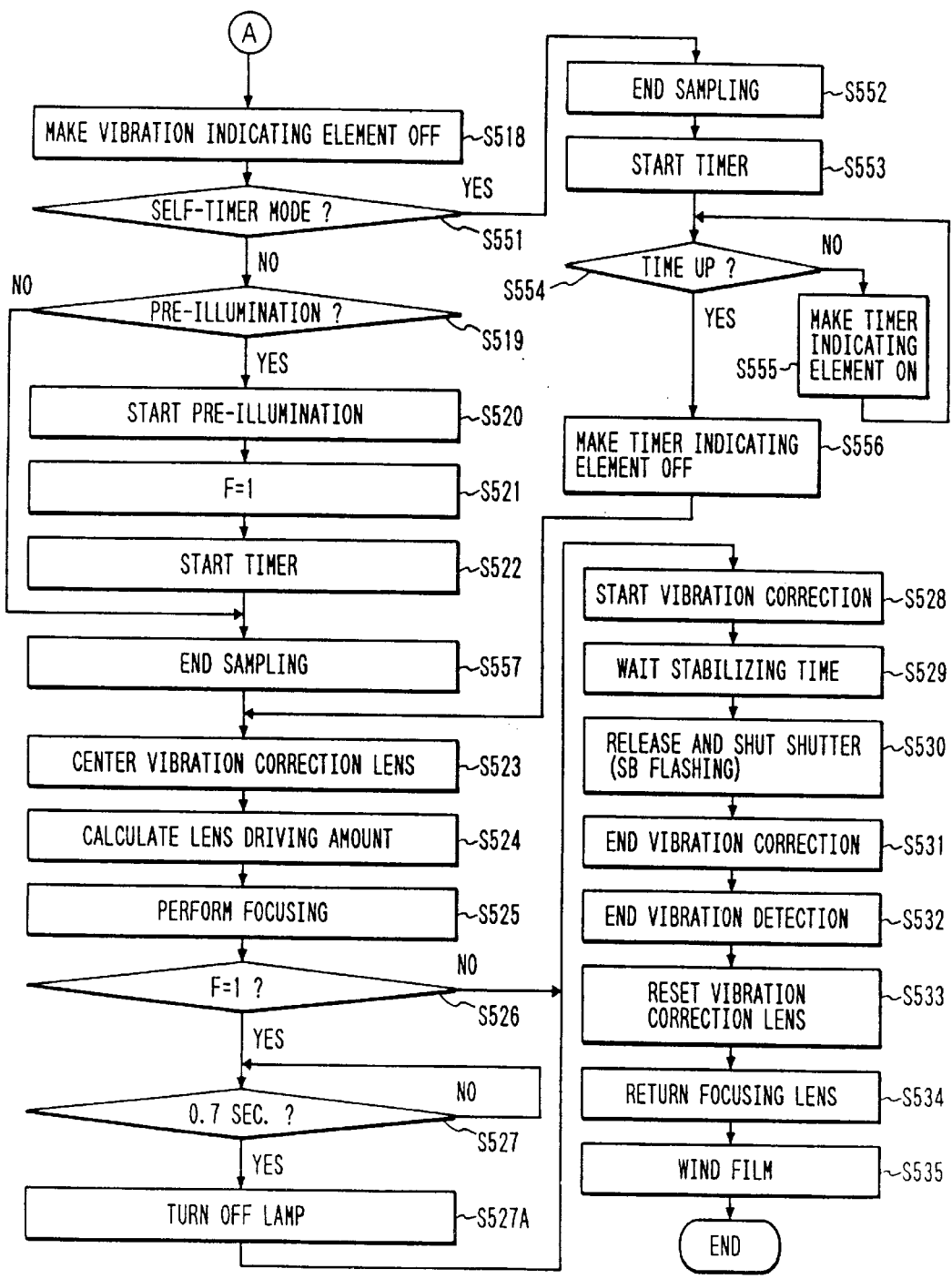
FIG. 19 is comprised of FIGS. 19A and 19B showing flowcharts showing an example process routine performed by a CPU 111 in FIG. 17B.
Figure 20B:
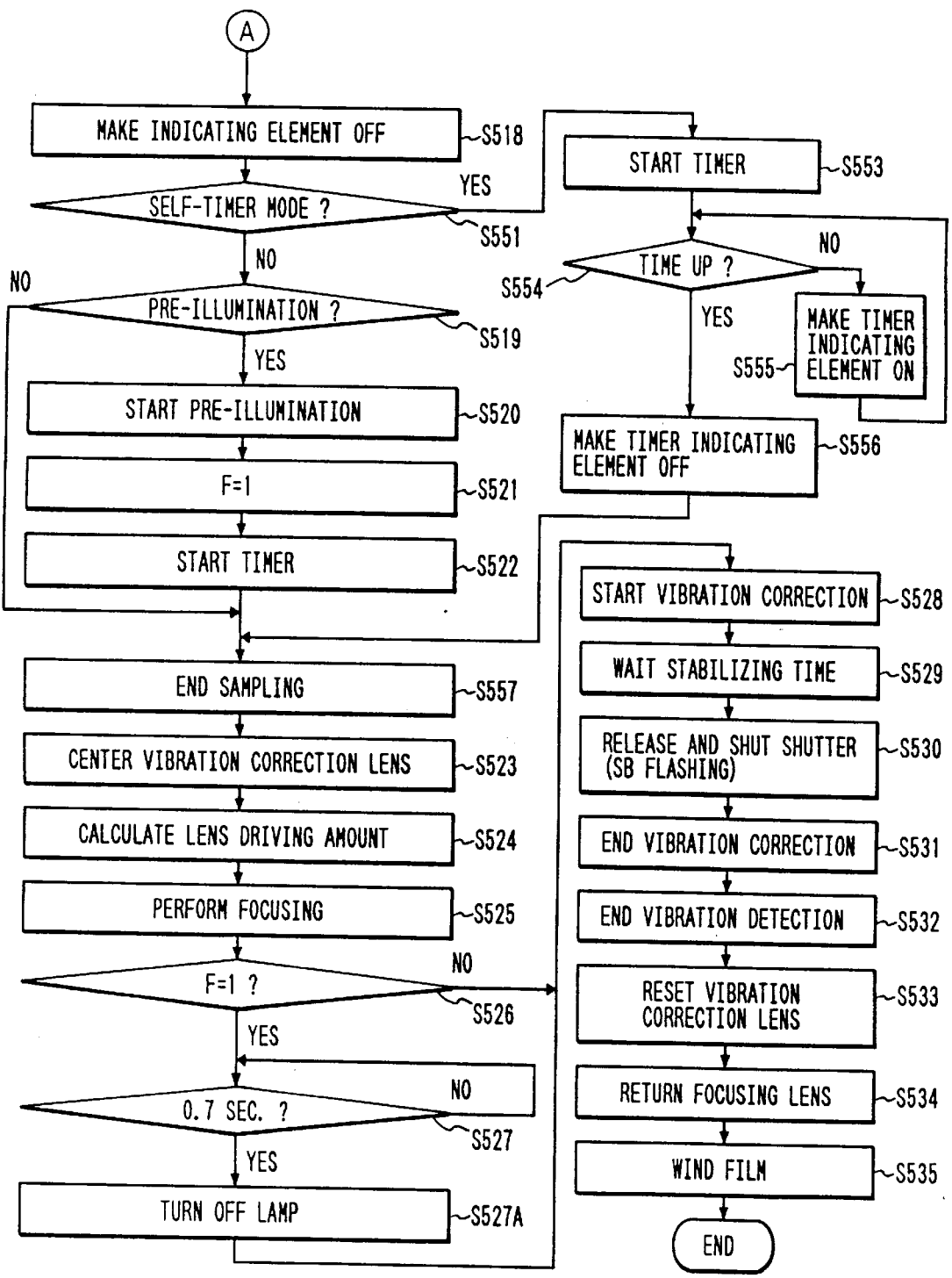
FIG. 20 is comprised of FIGS. 20A and 20B showing flowcharts showing another example process routine performed by the CPU 111 in FIG. 17B.

FIGS. 19A and 19B are flowcharts that show one example process routine that is performed by the CPU 111.

When the program is started at step S501, program control waits until the half-stroke switch SW21 is turned on at step S502. When the switch SW21 is turned on, the vibration detection sensor 118 is turned on, and detects the vibration. The detection sampling by the sensor 118 is performed, and the vibration reference level ($\omega=0$) is calculated by the vibration reference level calculating circuit 130 at step S550. Then, the vibration amount calculating circuit 131 calculates the vibration amount.

At step S504, the light amount measuring circuit 116 is activated and the measured light value at a subject is output (light amount measuring is performed). At step S505, the distance measuring circuit 117 is activated and the distance to the subject is output (distance measuring is performed).

After the distance measuring is terminated, this process will not be performed again unless the half-stroke switch SW21 is temporarily turned off and then turned on.

At step S506, the sensitivity detecting circuit 123 is activated, and the detected film ISO sensitivity is output. At step S507, a well known AE calculation is performed, which is based on the detected light value at the subject and the detected ISO sensitivity, to acquire the exposure value for a proper exposure. Also, the necessity for flashing and pre-flashing the electronic flashing unit 126 is examined. If the electronic flashing unit 126 is required for flashing, an SB flashing mode is set.

At step S508, FM (flashmatic) calculation is performed that is based on the measured distance to the subject, the ISO sensitivity, and the guide number of the electronic flashing unit 126, and an aperture value for flash photography is acquired.

At step S509, the output of the zoom motor rotation amount detecting circuit 122 is read and a current focusing distance for the lens is confirmed.

At step S510, a check is performed to determine whether the SB flashing mode is set. If the SB flashing mode is not set, program control moves to step S512. If the SB flashing mode is set, program control advances to step S511. At step S511, a check is performed to determine whether a battery for the electronic flashing unit 126 has been charged. If the charging of the battery has not been completed, the process routine is terminated. If the battery has been charged, program control moves to step S512.

At step S512, program control pauses for a stabilizing time until the sensor data sampling count, which is required for the detection of the vibration reference level ($\omega$=0) by employing the output of the vibration detecting sensor 118, is acquired.

At step S513, a check is performed to determine whether the amount of vibration, which is acquired by the vibration amount calculating circuit 131 via the vibration detecting sensor 118 and the vibration reference level calculating circuit 130, is equal to or greater than a predetermined value. When the acquired amount of vibration is equal to or greater than the predetermined value, a display element for indicating the existence of vibration (not shown) is lighted at step S514. When the acquired amount of vibration is less than the predetermined amount, the display element is turned on at step S515 to indicate the current state.

Then, at step S516, a check is performed to determine whether or not the full-stroke switch SW22 of the release button is on. When the full-stroke switch SW22 is off, at step S517, a check is performed to determine whether or not the half-stroke switch SW21 is on. When the half-stroke switch SW21 is off, the process routine is terminated. When the half-stroke switch SW21 is on, program control returns to step S513.

More specifically, when the half-stroke switch SW21 is in the ON state, a display can be constantly maintained that is in consonance with the vibration condition. During the ON state of the half-stroke switch SW21, the vibration reference level ($\omega$=0) is continuously monitored, so that, while the latest $\omega$=0 is constantly calculated and updated, the correct amount of vibration of the camera is detected.

If, at step S516, the full-stroke switch SW22 of the release button is in the ON state, the display element for indicating the presence of vibration is turned off at step S518 in FIG. 19B. At step S551, a check is performed to determine whether the mode is a self-timer mode. If the mode is not set to the self-timer mode, program control moves to step S519, where a check is performed to determine whether or not the pre-flashing (pre-irradiating) for red-eye reduction should be performed.

When the pre-flashing (pre-irradiating) is to be performed, program control goes to step S520, where the pre-flashing (pre-irradiating) of the red-eye reduction lamp 128 is started via the lamp driving circuit 127.

The flag F is set to "1" at step S521, a timer is started at step S522, and the sampling for detecting the vibration reference level ($\omega$=0) is terminated at step S557. Program control then moves to step S523. The timer times a waiting period for red-eye reduction.

At step S523, the centering circuit 124 is activated and drives the correcting lens 73 to the center position (the position where the light axis of the correcting lens 73 corresponds to the light axis of the lens).

When, at step S519, the pre-flashing is not to be performed, program control moves directly to step S523.

If, at step S551, the mode is set to the self-timer mode, program control advances to step S552, where the camera is located on a fixed object, and the sampling for detecting the vibration reference level ($\omega$=0) is terminated. At step S553, the timing is begun.

A check is performed at step S554 to determine whether the time has expired. If the time has not expired, a timer display is turned on and program control returns to step S554. When the time has expired, the timer display is turned off at step S556 and program control goes to step S523.

At step S524, the lens driving value that is required for focusing is calculated by employing the distance to the subject that is acquired through the above process. At step S525, the focusing motor M2 is driven via the focusing motor driver 119 to shift the focusing lens 74 by the value that is calculated for the lens shift.

With the rotation of the motor M2, the lens holder 81 is rotated via the gears 88 and 81a, and is shifted in the direction of the light axis by the action of the helicoids 80b and 81b. In other words, the focusing lens 74 is shifted in the direction of the light axis while rotating to perform focusing. The photo interrupter 90 accumulates information concerning the shift value for the focusing lens 74, and sends it to the CPU 111 via the focusing motor rotation amount detecting circuit 120.

At step S526, a check is performed to determine whether the flag F is "1". If the flag F is not "1", program control moves to step S528. If the flag F is "1", at step S527, program control moves to step S527A after a time has elapsed following the pre-flashing, i.e., the time for the period measured by the timer reaches 0.7 seconds.

The lamp 128 is turned off and the pre-flashing is stopped at step S527A, and the vibration correction is initiated at step S528. In other words, the Y-direction motor M3 and the X-direction motor M4 in FIG. 18 are driven by the vibration correction motor driver 114, and the correcting lens 73 is shifted in the direction that is perpendicular to the light axis a distance that is equal to the shift value, which is acquired by the vibration correction calculation.

At step S529, program control waits for a predetermined time until the shifting speed of the correcting lens 73 is stabilized. Then, at step S530, the shutter 82 that serves also as an aperture is opened and closed via the shutter-cum-stop motor driver 113.

When the SB flashing mode is set, the flashing of the electronic flashing unit 126 is performed in synchronization with the operation of the shutter 82.

At step S531, the Y-direction motor M3 and the X-direction motor M4 are halted to terminate the vibration correction. Then, the detection of the vibration amount by the vibration detecting sensor 118 is terminated at step S532. Further, the correcting lens 73 is moved to a predetermined reset position at step S533, the focusing lens 74 is restored to its reset position at step S534, and one frame of the film is wound up by the film winding circuit 125 at step S535. The process routine is thereafter terminated.

In the above described process routine in FIGS. 19A and 19B, when, at step S551, the self-timer mode is set, the detection sampling of the vibration reference level ($\omega$=0) by the vibration detecting sensor 118 is terminated, and then, at step S553 the timing by the self timer is performed.

However, another process routine may be performed. As in another example process routine performed by the CPU 111 in FIGS. 20A and 20B, when, at step S551 (FIG. 20B), the self-timer mode is set, the timing by the self-timer at step S553 and the following steps are performed. The detection sampling of the vibration reference level (ω=0) from the vibration detecting sensor 118 is continued during the timing period. When the timing sequence is terminated, the detection sampling for the vibration reference level (ω=0) is terminated at step S557.

In the above described embodiment, the vibration detecting sensor 118 serves as vibration detecting means; the X-direction and Y-direction drive mechanisms 150x and 150y serve as vibration correction driving means; the distance measuring circuit 117 serves as distance measuring means; the focusing motor M2 and the CPU 111 serve as focusing means; the lamp 128 for pre-flashing serves as pre-irradiating means for red-eye reduction; and the CPU 111 serves as flashing means and control means.

With the above described arrangement, the vibration detecting sensor 118 is powered on by turning on the half-stroke switch SW21 at the release button, and the sampling of sensor signals is initiated to detect the vibration reference level (ω=0). When it is found that the full-stroke switch SW22 is turned on after a predetermined period of time has elapsed, the sampling is terminated, the vibration reference level is acquired, and the amount of vibration for the camera is detected. The vibration correction is performed by using the detected amount of vibration. When the half-stroke manipulation of the release button is very extended, the detection sampling for the vibration reference level is continued until immediately before the full-stroke switch SW22 is turned on, so that the exact amount of vibration immediately before photographing can be obtained and the vibration can be properly corrected.

The vibration reference level calculating circuit 130 is halted before the vibration correction drive mechanisms 150x and 150y are activated.

For stroboscopic photographing that accompanies the pre-irradiation for red-eye reduction, the detection sampling for the vibration reference level is continued during the pre-irradiation. Since even during the approximately 0.7 seconds of the pre-irradiation for red-eye reduction, the sampling is continued, and the exact amount of vibration immediately before the exposure can be obtained and the vibration can be properly corrected.

Further, for a self-timer exposure, the detection sampling for the vibration reference level is also continued during the operation of the timer. As the sampling is still being performed while the self-timer is in operation, the exact vibration amount immediately before the exposure can be detected even when a less rigid tripod is used, and the vibration can be corrected under the required conditions.

The self-timer mechanism is started by the ON signal for the full-stroke switch SW22. The vibration detecting sensor 118 is powered off when the half-stroke switch SW21 is turned off.

The distance measuring circuit 117 that measures the distance to a subject outputs data for one calculated distance in a period that extends from the point the half-stroke switch SW21 is turned on until the point the full-stroke switch SW22 is turned on.

The present invention is not limited to the arrangement of the above described embodiments, and the shapes and structures of the individual components can be properly modified or altered.

For example, although the camera with a vibration correcting function that is employed in the above described embodiment shifts the correcting lens 73 to an original position during the red-eye reduction waiting period and then performs focusing, the order in which these processes are executed may be inverted.

The arrangement of the vibration correcting unit is not limited to that shown in FIG. 18, and the position of the correcting lens 73 is not limited to that which is indicated for the embodiment. Further, although the lamp 128 is employed as a pre-flashing device for red-eye reduction, an electronic flashing unit (stroboscopic unit) may also serve in this capacity.

What is claimed is:

1. A vibration preventing camera, comprising:
   a vibration detector to detect an amount of vibration;
   a vibration correction device to correct the amount of vibration detected by said vibration detector;
   a light measuring device to measure a light value of a subject; and
   a controller to control said vibration correction device in consonance with a detection signal obtained from said light measuring device and said vibration detector, and to activate said vibration detector after a length of exposure is determined based on the light value; and
   a self-timer to measure elapsed time, wherein, when said self-timer is set to control an exposure by triggering a shutter, said vibration detector is activated immediately after a count down of said self-timer begins.

2. A vibration preventing camera according to claim 1, further comprising a film sensitivity identifying device to identify a light sensitivity of a loaded film, wherein a first required shutter speed is calculated by the light value of the subject and the light sensitivity of said loaded film, wherein said vibration detector is activated only when said shutter speed is slower than a predetermined speed.

3. A vibration preventing camera according to claim 1, further comprising a focusing distance identifying device to identify a focusing distance for a mounted lens, wherein a second required shutter speed is calculated by the light value of the subject and the light sensitivity of said loaded film, wherein said vibration detector is activated only when said shutter speed is slower than the second required shutter speed.

4. A vibration preventing camera comprising:
   a vibration detector to detect an amount of vibration;
   a vibration correction device to correct the amount of vibration detected by said vibration detector;
   a controller to control said vibration correction device in consonance with a detection signal that is output by said vibration detector;
   an exposure preparing device to start exposure preparation; and
   a self-timer to measure a time period, wherein during the time period, said vibration detector is activated after said exposure preparing device begins an exposure preparation sequence, and said controller initiates the vibration detector.

5. A vibration preventing camera comprising:
   a vibration detector to detect an amount of vibration;
   a vibration correction device to correct the amount of vibration detected by said vibration detector;
   a controller to control said vibration correction device in consonance with a detection signal that is output from said vibration detector; and a self-timer to measure a time period, wherein during the time period, said vibration detector is activated after an exposure preparation sequence is started by said self-timer, and said controller initiates the vibration detector.

6. A vibration preventing camera comprising:
a vibration detector to detect an amount of vibration;
a vibration correction device to correct the amount of vibration detected by said vibration detector;
a controller to control said vibration correction device in connection with a detection signal that is output from said vibration detector; and
a vibration determining device employing at least one of an adjusted exposure value and optical system exposure data to determine whether vibration is occurring, with said controller activating said vibration detector when said vibration determining device determines that vibration is occurring.

7. A vibration preventing camera comprising:
a vibration detector to detect an amount of vibration;
a vibration correction device to correct the amount of vibration detected by said vibration detector;
a controller to control said vibration correction device in connection with a detection signal that is output from said vibration detector;
a self-timer; and
a vibration determining device employing at least one of an adjusted exposure value and optical system exposure data to determine whether vibration is occurring, with said controller activating said vibration detector when said vibration determining device ascertains that vibration is occurring, regardless of the timing for the exposure by said self-timer.

8. A vibration preventing camera according to claim 7, wherein said controller continues the operation of said vibration detector while said self-timer is operating.

9. A vibration preventing camera, comprising:
a vibration detector to detect an amount of vibration and to output a detection signal based on a detection result;
a vibration correction device to correct vibration in response to said detection signal;
a controller to control an activation of said vibration correction device;
a self-timer to measure a predetermined period of time; and
a halting device to halt a vibration correcting process performed by said vibration correction device after the predetermined period of time measured by said self-timer has elapsed following the activation of said vibration correction device.

10. A vibration preventing camera according to claim 9, wherein the measuring for the predetermined period of time is begun when a full-stroke position for a shutter release member is reached.

11. A vibration preventing camera according to claim 10, further comprising an exposure controller to control an exposure operation, wherein said halting device halts a vibration correcting operation which is performed by said vibration correction device, after a specified period of time has elapsed, which specified period of time is longer than a maximum period that is controlled by said exposure controller.

12. A vibration preventing camera according to claim 9, wherein said vibration correction device outputs a start signal as the vibration correction process begins, further comprising:

first and second timers to measure time in response to said start signal;
a focusing device to perform a focusing operation by shifting a focus lens; and
a feeding device to advance a film,
wherein the first timer measures a first predetermined period that continues until the vibration correcting process is halted, and the second timer measures a second predetermined period that continues until one of said focusing device begins to return a focusing lens and said feeding device starts to advance one frame of film, and the second time period that the second timer measures is set to be longer than the first time period of the first timer.

13. A vibration preventing device comprising:
a distance measuring device to measure a distance between the vibration preventing device and an object;
a focusing device to focus on the object based on the distance measured by said distance measuring device;
a shutter device to control an exposure time;
a vibration detector to detect an amount of vibration on a film plane;
a vibration correction device to drive a vibration preventing lens based on the amount of vibration to prevent image vibration;
a battery presence detector to detect a presence of a battery;
a film presence detector to detect a presence of film; and
a controller to activate said vibration correction device in response to detection signals from said battery presence detector and said film presence detector.

14. A vibration preventing device according to claim 13, wherein said battery presence detector detects the presence of the battery when a battery cover is opened then closed to load said battery.

15. A vibration preventing device according to claim 13, wherein said film presence detector detects the presence of film when a removing and loading operation of said film is accompanied with an opening and closing of a camera back cover.

16. A vibration preventing device according to claim 13, wherein said vibration detector is preferably so designed that said vibration detector detects an amount of vibration by employing an angular velocity sensor.

17. A vibration preventing camera comprising:
a vibration detector to detect an amount of vibration;
a vibration reference level calculator to calculate a vibration reference level in connection with a detection signal from said vibration detector;
a vibration correction device to correct the amount of vibration;
a first switch to activate said vibration detector; and
a second switch to activate said vibration correction device,
wherein said vibration reference level calculator operates until said second switch is turned on after said first switch is turned on.

18. A vibration preventing camera according to claim 17, further comprising a red-eye reduction pre-irradiating device to pre-emit light before actual exposure to avoid a red-eye phenomenon, wherein said vibration reference level calculator operates even during pre-irradiation.

19. A vibration preventing camera according to claim 17, further comprising a self-timer to control a timing of an exposure, wherein said reference level calculator operates while said self-timer is operating.

20. A vibration preventing camera according to claim 19, wherein said self-timer means is started by an ON signal from said second switch.

21. A vibration preventing camera according to claim 17, wherein said vibration detector is turned off when said first switch is turned off.

22. A vibration preventing camera according to claim 17, further comprising a distance measuring device to measure a distance between the vibration preventing camera and an object, wherein said distance measuring device outputs the distance measured by said distance measuring device when said first switch is turned on until when said second switch is turned off.

23. A vibration preventing camera according to claim 22, wherein said vibration reference level calculator is halted before the vibration correction device is activated.

* * * * *